(12) United States Patent
Minegishi

(10) Patent No.: US 10,620,888 B2
(45) Date of Patent: Apr. 14, 2020

(54) INFORMATION PROCESSING APPARATUS, INFORMATION PROCESSING METHOD, AND NON-TRANSITORY RECORDING MEDIUM FOR CONVERTING COLOR PRINT DATA TO TRANSPARENT TONER PRINT DATA

(71) Applicant: Youichi Minegishi, Kanagawa (JP)

(72) Inventor: Youichi Minegishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 5 days.

(21) Appl. No.: 16/163,929

(22) Filed: Oct. 18, 2018

(65) Prior Publication Data

US 2019/0196754 A1 Jun. 27, 2019

(30) Foreign Application Priority Data

Dec. 27, 2017 (JP) .................. 2017-252636

(51) Int. Cl.
*H04N 1/54* (2006.01)
*H04N 1/60* (2006.01)
*G06F 3/12* (2006.01)
*H04N 1/32* (2006.01)

(52) U.S. Cl.
CPC .......... *G06F 3/1206* (2013.01); *G06F 3/1208* (2013.01); *G06F 3/1242* (2013.01); *G06F 3/1247* (2013.01); *G06F 3/1276* (2013.01); *G06F 3/1285* (2013.01);
(Continued)

(58) Field of Classification Search
CPC ............ G03G 15/0126; G03G 15/08; G03G 15/5004; G03G 15/5054; G03G 15/5062; G03G 15/5075; G03G 2215/00569; G03G 2215/0177; G06F 1/3203; H04N 1/00307; H04N 1/6027; H04N 1/6033; H04N 1/6036; H04N 2201/0094; Y02D 10/159;
(Continued)

(56) References Cited

U.S. PATENT DOCUMENTS

2003/0081232 A1* 5/2003 Maeda ............... G03G 15/0126
358/1.9
2004/0113957 A1* 6/2004 Han ...................... G06K 15/02
347/1
(Continued)

FOREIGN PATENT DOCUMENTS

| JP | 2010-288076 | 12/2010 |
| JP | 2013-008353 | 1/2013 |
| JP | 2015-081959 | 4/2015 |

OTHER PUBLICATIONS

ErgoSoft AG, Printing with White Ink or Finish/Varnish Application Notes, (c) 2010 ErgoSoft AG, Rev 1.1 (Year: 2010).*

*Primary Examiner* — Negussie Worku
(74) *Attorney, Agent, or Firm* — Harness, Dickey & Pierce P.L.C.

(57) ABSTRACT

An information processing apparatus includes circuitry and a communication interface. The circuitry acquires first print data in a red-green-blue format, and converts the first print data into second print data. The second print data corresponds to a color of a first toner stored in an image forming apparatus and to be replaced by a transparent toner in the image forming apparatus. The communication interface transmits the second print data to the image forming apparatus.

20 Claims, 18 Drawing Sheets

(52) U.S. Cl.
CPC ....... *G06F 3/1293* (2013.01); *H04N 1/32309* (2013.01); *H04N 1/54* (2013.01); *H04N 1/6022* (2013.01)

(58) Field of Classification Search
CPC .. G06K 15/02; G06K 15/128; G06K 15/1822; G06K 15/1835; G06K 15/1857
See application file for complete search history.

(56) References Cited

U.S. PATENT DOCUMENTS

| | | | |
|---|---|---|---|
| 2007/0119937 A1* | 5/2007 | Kikuta | G03G 15/5004 235/462.3 |
| 2008/0158577 A1* | 7/2008 | Yamaguchi | H04N 1/506 358/1.9 |
| 2011/0019213 A1* | 1/2011 | Safonov | G06K 15/128 358/1.9 |
| 2016/0191750 A1* | 6/2016 | Chung | G03G 15/5062 358/3.23 |
| 2017/0153884 A1* | 6/2017 | Minegishi | G06F 8/65 |
| 2017/0220304 A1* | 8/2017 | Ando | H04N 1/00244 |
| 2018/0227445 A1* | 8/2018 | Minegishi | H04N 1/00416 |
| 2018/0260176 A1* | 9/2018 | Arockiasamy | H04N 1/6008 |

* cited by examiner

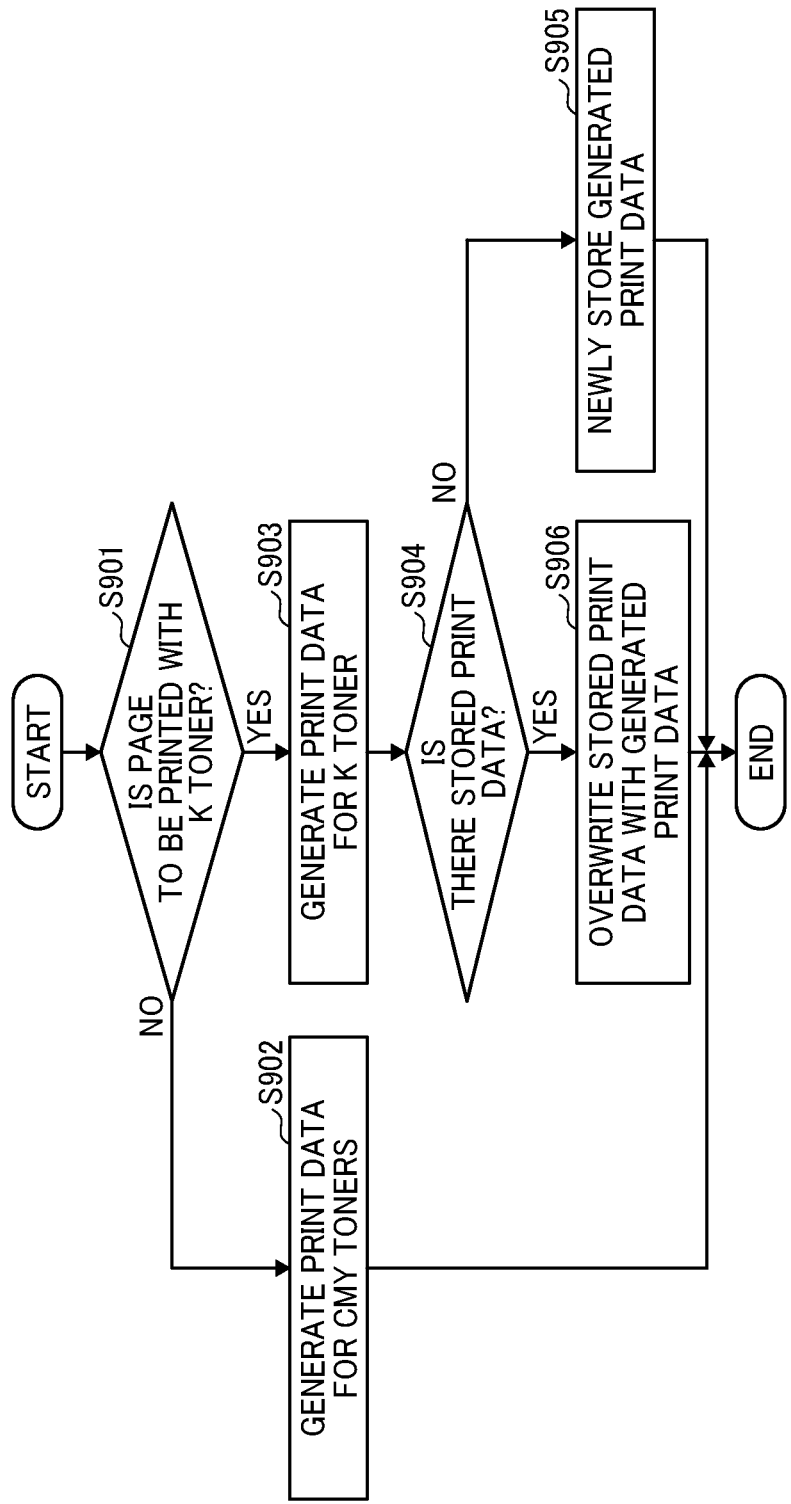

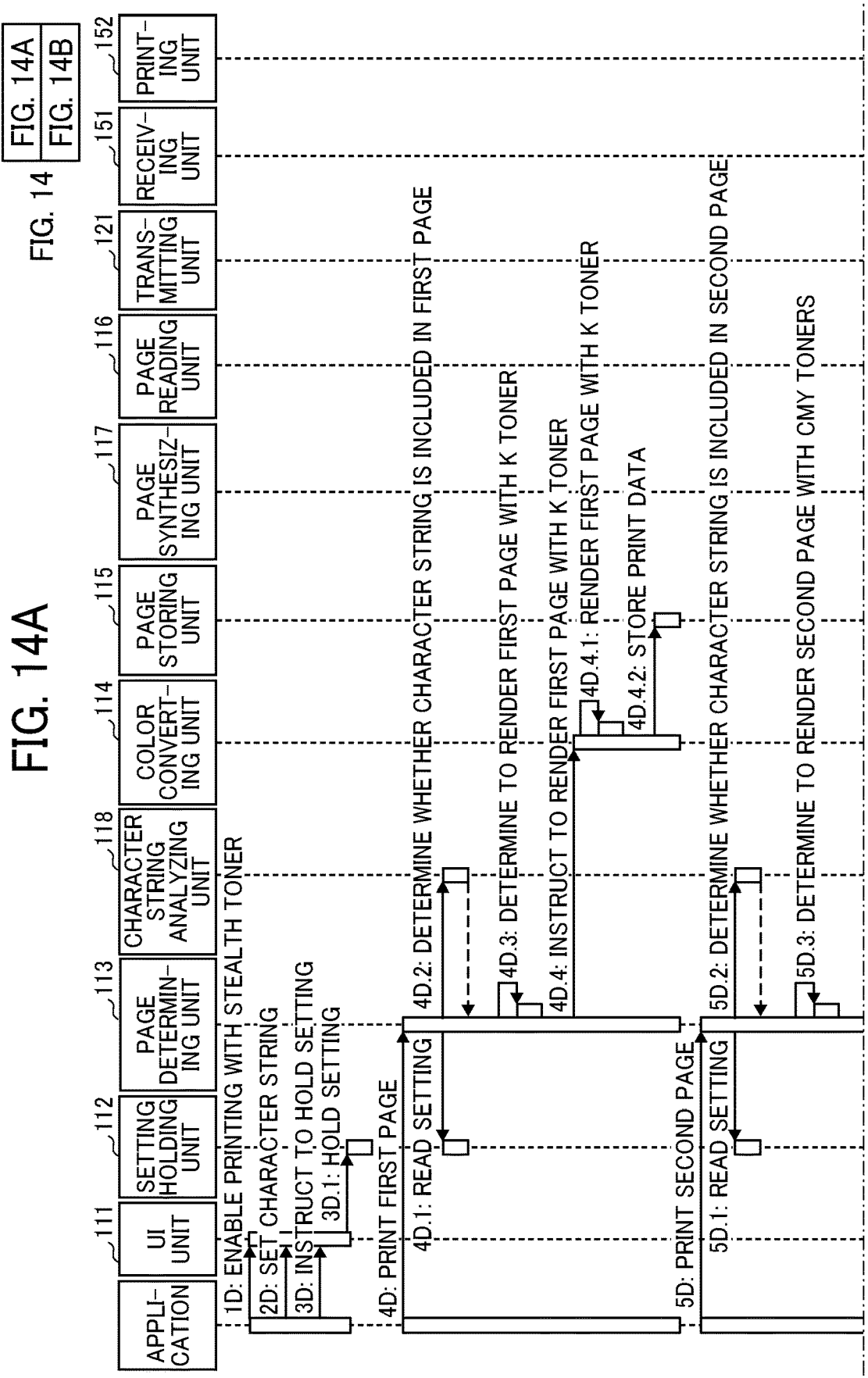

INFORMATION PROCESSING APPARATUS, INFORMATION PROCESSING METHOD, AND NON-TRANSITORY RECORDING MEDIUM FOR CONVERTING COLOR PRINT DATA TO TRANSPARENT TONER PRINT DATA

CROSS-REFERENCE TO RELATED APPLICATION

This patent application is based on and claims priority pursuant to 35 U.S.C. § 119(a) to Japanese Patent Application No. 2017-252636 filed on Dec. 27, 2017, in the Japan Patent Office, the entire disclosure of which is hereby incorporated by reference herein.

BACKGROUND

Technical Field

The present invention relates to an information processing apparatus, an information processing method, and a non-transitory recording medium.

Description of the Related Art

There is a technique for an image forming apparatus to analyze and process print information received from a personal computer to generate red-green-blue (RGB)-formatted image data and transparent image data, perform color conversion on the RGB-formatted image data to generate color image data in four colors: black, yellow, magenta, and cyan, print the color image data with color toners, and print the transparent image data with a transparent toner without performing color conversion on the transparent image data.

A printer driver receives the transparent image data separately from the RGB-formatted image data. A general-purpose interface used in the printer driver (e.g., a graphic device interface (GDI)), however, only accepts the RGB-formatted image data, and thus is normally customized to receive the transparent image data. Further, the above-described technique does not allow the image of a specific part of the RGB-formatted image data to be printed with the transparent toner.

SUMMARY

In one embodiment of this invention, there is provided an improved information processing apparatus that includes, for example, circuitry and a communication interface. The circuitry acquires first print data in a red-green-blue format, and converts the first print data into second print data. The second print data corresponds to a color of a first toner stored in an image forming apparatus and to be replaced by a transparent toner in the image forming apparatus. The communication interface transmits the second print data to the image forming apparatus.

In one embodiment of this invention, there is provided an improved information processing method that includes, for example, acquiring first print data in a red-green-blue format, converting the first print data into second print data, the second print data corresponding to a color of a first toner stored in an image forming apparatus and to be replaced by a transparent toner in the image forming apparatus, and transmitting the second print data to the image forming apparatus.

In one embodiment of this invention, there is provided a non-transitory recording medium storing a plurality of instructions which, when executed by one or more processors, cause the processors to perform the above-described information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 is a flowchart illustrating a processing procedure of the PC according to the third embodiment;

FIGS. 14A and 14B are a diagram illustrating a sequence of processes performed by the information processing system according to the fourth embodiment;

Figure 1:
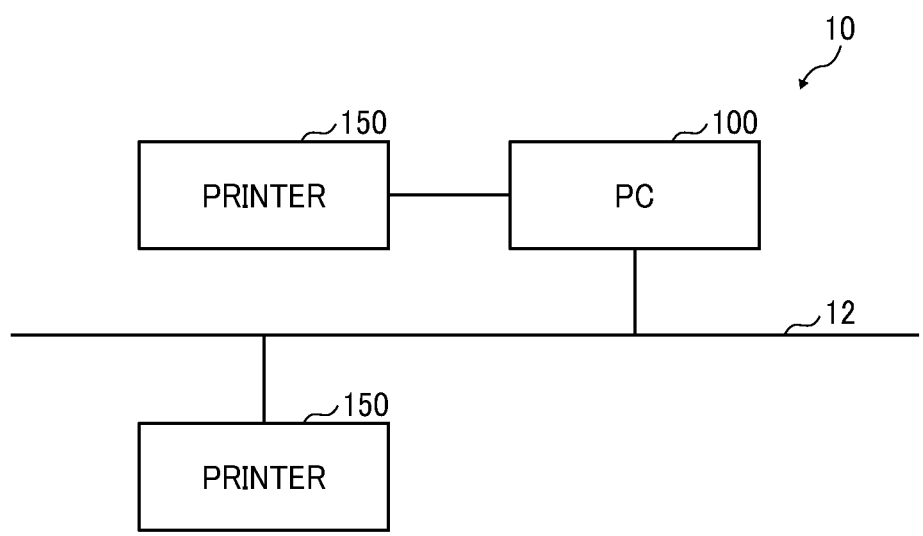
FIG. 1 is a diagram illustrating a configuration of an information processing system according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A first embodiment of the present invention will be described with reference to drawings. A configuration of an information processing system according to the first embodiment will first be described.

FIG. 1 is a diagram illustrating a configuration of an information processing system 10 according to the first embodiment. The information processing system 10 illustrated in FIG. 1 includes a personal computer (PC) 100 and a plurality of printers 150. As an example of an information processing apparatus, the PC 100 is an apparatus that controls printing of the printers 150. As an example of an image forming apparatus, each of the printers 150 is an apparatus that performs printing on a print medium. The printers 150 are connected to the PC 100 to be communicable with the PC 100. For instance, in the example illustrated in FIG. 1, one of the printers 150 is directly connected to the PC 100. The connection may be performed with a universal serial bus (USB), for example. Further, in the example illustrated in FIG. 1, the other printer 150 is connected to the PC 100 via a network 12. The network 12 may be an in-house local area network (LAN) or a virtual private network (VPN), for example. The connection between the PC 100 and the network 12 may be wireless or wired communication connection. The information processing apparatus is not limited to the PC, and may be another apparatus, such as a tablet terminal or a smartphone, for example. Further, the information processing apparatus may be built in each of the printers 150.

In the first embodiment, a color printer capable of storing four color toners: a cyan (C) toner, a magenta (M) toner, a yellow (Y) toner, and a black (K) toner is employed as each of the printers 150. Further, in the first embodiment, each of the printers 150 stores a stealth toner in place of the K toner. The stealth toner, which is an example of a transparent toner, is difficult for human eyes to perceive, and is recognizable by a dedicated device. Herein, each of the printers 150 recognizes the stealth toner as the K toner. Therefore, the printer 150 does not need to recognize that the stealth toner is stored therein, and does not require a special configuration to use the stealth toner. Hereinafter, the C toner, the M toner, and the Y toner will be collectively referred to as the CMY toners.

A description will be given of a functional configuration of the information processing system 10 according to the first embodiment, first of a functional configuration of the PC 100 and then of a functional configuration of each of the printers 150.

Figure 2:
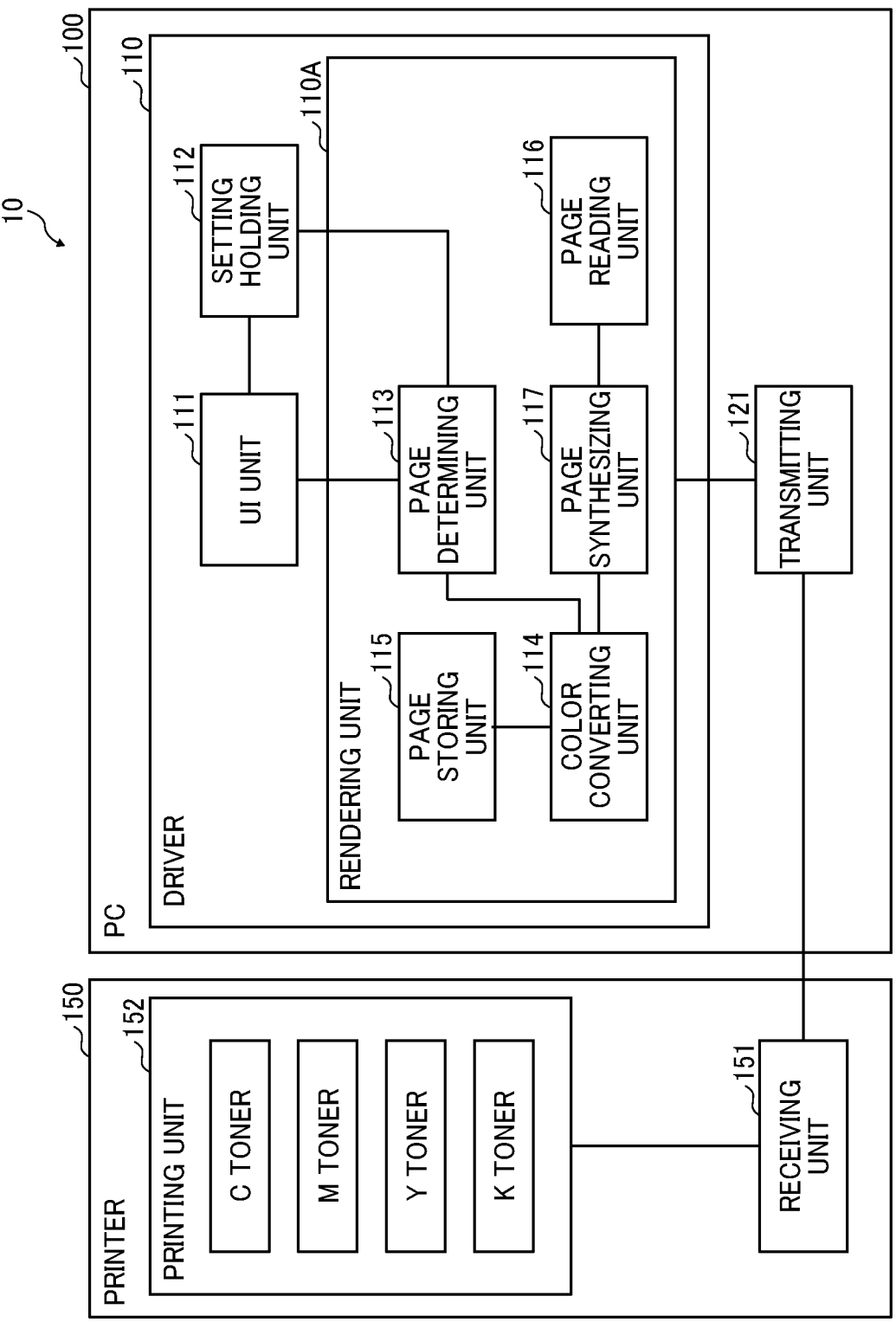
FIG. 2 is a diagram illustrating a functional configuration of the information processing system according to the first embodiment.

FIG. 2 is a diagram illustrating a functional configuration of the information processing system 10 according to the first embodiment.

As illustrated in FIG. 2, the PC 100 has a driver 110 including a user interface (UI) unit 111, a setting holding unit 112, a rendering unit 110A, and a transmitting unit 121 as functional units thereof. The rendering unit 110A includes a page determining unit 113, a color converting unit 114, a page storing unit 115, a page reading unit 116, and a page synthesizing unit 117.

The UI unit 111 sets ON or OFF a function of printing with the stealth toner (hereinafter referred to as the stealth toner print function) in accordance with an input performed by a user. For example, the UI unit 111 displays a UI screen 300 illustrated in FIG. 3 on a display of the PC 100. The UI unit 111 then stores the setting made on the UI screen 300 into the setting holding unit 112.

The page determining unit 113 acquires print data transmitted from an application. The print data transmitted from the application is an example of first print data. The page determining unit 113 then determines whether to use the stealth toner or the CMY toners to print each of print pages included in the print data acquired from the application. In the first embodiment, if the setting holding unit 112 holds the setting to turn ON the stealth toner print function, the page determining unit 113 determines to print the first print page with the stealth toner and print the second and subsequent print pages with the CMY toners, and instructs the color converting unit 114 to print the first print page with the stealth toner and print the second and subsequent print pages with the CMY toners. If the setting holding unit 112 holds the setting to turn OFF the stealth toner print function, the page determining unit 113 determines to print all print pages with the CMY toners, and instructs the color converting unit 114 to print all print pages with the CMY toners.

The color converting unit 114 converts the print data transmitted from the application into print data for the K toner or print data for the CMY toners based on the determination made by the page determining unit 113. The print data for the K toner is an example of second print data, and the print data for the CMY toners is an example of third print data.

The page storing unit 115 stores the print data for the K toner generated by the color converting unit 114 at a predetermined storage destination, such as a predetermined folder in a hard disk drive (HDD) included in the PC 100, for example. In the present embodiment, the application may be any application having a print function, and the print data transmitted from the application is RGB-formatted print data.

The page reading unit 116 reads the print data for the K toner from the predetermined storage destination.

The page synthesizing unit 117 combines the print data for the K toner read by the page reading unit 116 (i.e., the print data of the first page) with the print data for the CMY toners generated by the color converting unit 114 (i.e., the print data of the second and subsequent pages).

The transmitting unit 121 transmits the print data for the CMY toners combined with the print data for the K toner to the printer 150.

As illustrated in FIG. 2, the printer 150 includes a receiving unit 151 and a printing unit 152 as functional units thereof. The receiving unit 151 receives the print data transmitted from the PC 100, i.e., the print data for the CMY toners combined with the print data for the K toner. The printing unit 152 prints an image on a print medium based on the print data received by the receiving unit 151. Specifically, for each of the second and subsequent pages, the printing unit 152 uses the CMY toners to print the print data originally included in the each of the second and subsequent pages, and uses the stealth toner to print the print data of the first page combined with the print data of the each of the second and subsequent pages.

The above-described functions of the PC 100 are implemented by an information processing program stored in a variety of memory devices (e.g., a read only memory (ROM), a random access memory (RAM), a flash memory, and an HDD) and executed by a central processing unit (CPU) or a computer in the PC 100, for example. The information processing program may be provided as previously introduced in the PC 100, or may be externally provided and introduced into the PC 100. In the latter case, the information processing program may be provided via an external storage medium (e.g., a USB memory, a memory card, or a compact disc (CD)-ROM), or may be provided as downloaded from a server on a network (e.g., the Internet).

Figure 3:
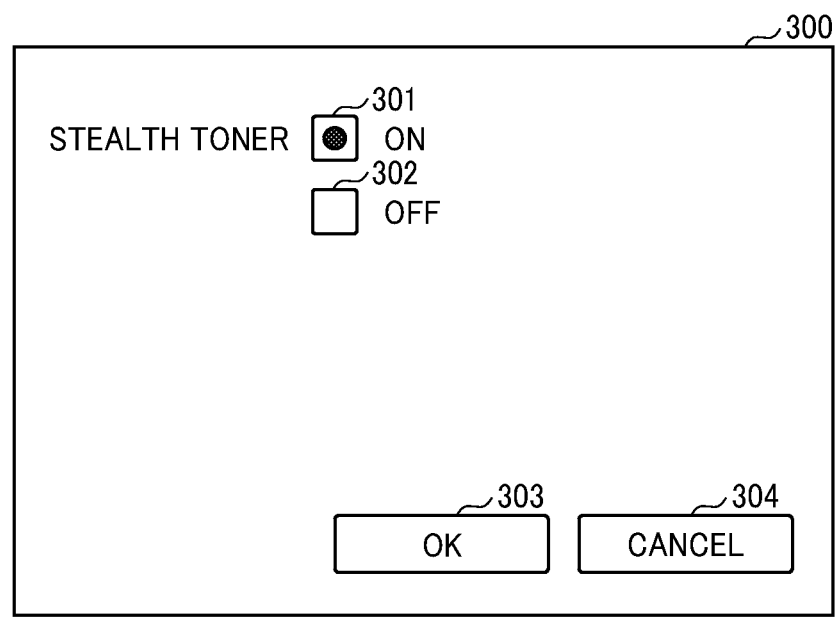
FIG. 3 is a diagram illustrating an example of a user interface (UI) screen displayed on a personal computer (PC) of the information processing system according to the first embodiment.

FIG. 3 is a diagram illustrating an example of the UI screen 300 displayed on the PC 100 according to the first embodiment. The UI screen 300 illustrated in FIG. 3 is a setting screen displayed on the display of the PC 100 under the control of the UI unit 111 to allow the user to switch between ON and OFF of the stealth toner print function. As illustrated in FIG. 3, the UI screen 300 includes an ON checkbox 301, an OFF checkbox 302, an OK button 303, and a cancel button 304. For example, if the OK button 303 is pressed with the ON checkbox 301 selected on the thus-configured UI screen 300, the stealth toner print function is switched ON, and setting information indicating that the stealth toner print function is switched ON is held in the setting holding unit 112. On the other hand, if the OK button 303 is pressed with the OFF checkbox 302 selected on the UI screen 300, for example, the stealth toner print function is switched OFF, and setting information indicating that the stealth toner print function is switched OFF is held in the setting holding unit 112. The cancel button 304 is used to complete the setting process without switching between ON and OFF of the stealth toner print function, i.e., without changing the current setting held in the setting holding unit 112.

A sequence of processes performed by the information processing system 10 according to the first embodiment will be described.

Figure 4:
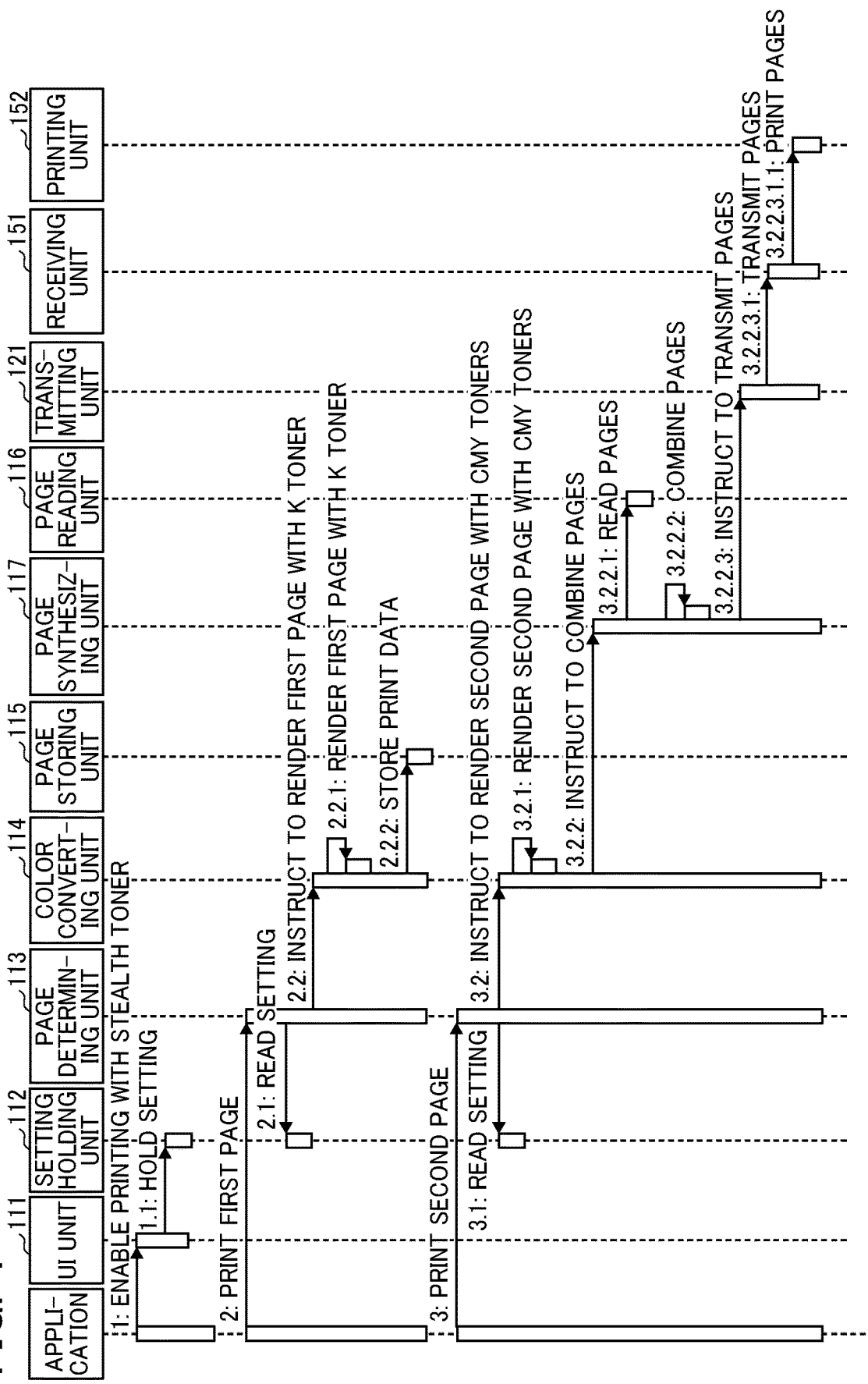
FIG. 4 is a diagram illustrating a sequence of processes performed by the information processing system according to the first embodiment.

FIG. 4 is a diagram illustrating a sequence of processes performed by the information processing system 10 according to the first embodiment.

In sequence 1, the stealth toner print function is first turned ON by the application via the UI unit 111 in the PC 100. This setting of the stealth toner print function is made on the UI screen 300 illustrated in FIG. 3, for example, and is held in the setting holding unit 112 (sequence 1.1).

In sequence 2, in response to the print data of the first page transmitted from the application, the page determining unit 113 reads the setting of the stealth toner print function from the setting holding unit 112 (sequence 2.1). If the setting is ON, the page determining unit 113 instructs the color converting unit 114 to print the print data of the first page with the K toner (i.e., stealth toner) (sequence 2.2).

In accordance with this instruction, the color converting unit 114 converts the print data of the first page into the print data for the K toner (i.e., stealth toner) (sequence 2.2.1). For example, the color converting unit 114 converts the print data of the first page into monochrome data with a conversion formula $Y=0.299R+0.587G+0.114B$, to thereby generate the print data for the K toner (i.e., stealth toner). If the print data of the first page is already monochrome data, however, the color converting unit 114 directly uses the print data of the first page as the print data for the K toner (i.e., stealth toner). The color converting unit 114 then converts the print data for the K toner (i.e., stealth toner) into print data in the page description language (PDL) command format. The color converting unit 114 may not perform image processing such as color matching and dithering on the print data for the K toner (i.e., stealth toner).

After having generated the print data for the K toner, the color converting unit 114 stores the print data in the page storing unit 115 (sequence 2.2.2). The storage destination of the print data may be a predetermined folder in the HDD obtainable with the GetTempPath function of an operating system (OS) of Windows (registered trademark), for example.

In sequence 3, in response to the print data of the second page transmitted from the application, the page determining unit 113 reads the setting of the stealth toner print function from the setting holding unit 112 (sequence 3.1). If the setting is ON, the page determining unit 113 instructs the color converting unit 114 to print the print data of the second page with the CMY toners (sequence 3.2).

In accordance with this instruction, the color converting unit 114 converts the print data of the second page into the print data for the CMY toners (sequence 3.2.1). In this process, the color converting unit 114 uses the CMY toners to print a black area in the second page, which originally should be printed with the K toner. For example, it is possible to express black color by using the CMY toners with respective densities thereof set to be equal.

After having generated the print data for the CMY toners, the color converting unit 114 instructs the page synthesizing unit 117 to combine the print data for the K toner with the print data for the CMY toners (sequence 3.2.2). In accordance with this instruction, the page synthesizing unit 117 reads the print data for the K toner from the predetermined storage destination (sequence 3.2.2.1), and combines the print data for the K toner with the print data for the CMY toners (sequence 3.2.2.2). An example of combination of print data performed by the page synthesizing unit 117 will be described later with reference to FIG. 5.

The page synthesizing unit 117 then instructs the transmitting unit 121 to transmit the print data for the CMY toners combined with the print data for the K toner (sequence 3.2.2.3). In accordance with this instruction, the transmitting unit 121 transmits the print data for the CMY toners combined with the print data for the K toner to the printer 150 (sequence 3.2.2.3.1).

In the printer 150, the receiving unit 151 receives the print data transmitted from the PC 100, and the printing unit 152 prints an image on a print medium based on the print data (sequence 3.2.2.3.1.1). Specifically, for each of the second and subsequent pages, the printing unit 152 uses the CMY toners to print the print data originally included in the each of the second and subsequent pages, and uses the stealth toner, which is stored in the printer 150 in place of the K toner, to print the print data of the first page combined with the print data of the each of the second and subsequent pages.

With the above-described sequence of processes, the printer 150 prints the print data of the second page on the print medium with the CMY toners, and prints the print data of the first page over the print data of the second page with the stealth toner. In the above sequence of processes, the print data of the first page is printed over the print data of each of the third and subsequent pages, similarly as over the print data of the second page. Further, if the setting of the stealth toner print function is OFF in the above sequence of processes, the printer 150 performs normal printing with the CMY toners for all print pages.

Figure 5:
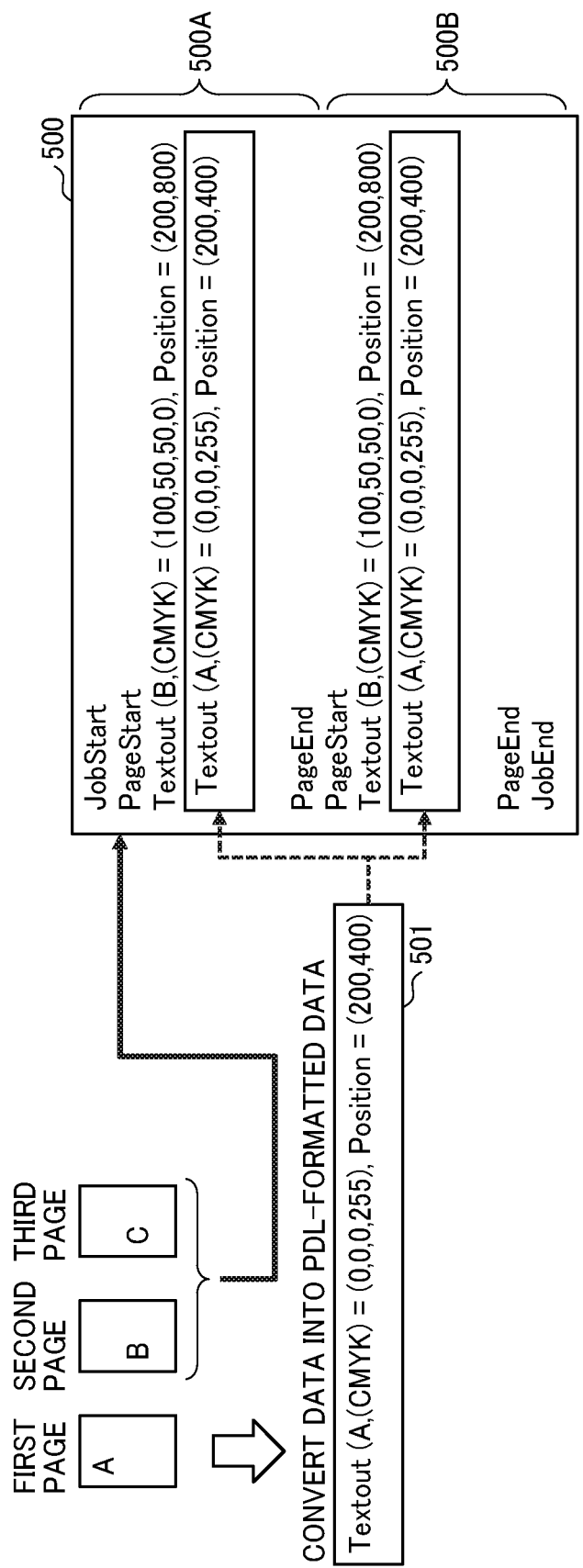
FIG. 5 is a diagram illustrating an example of combination of print data performed by a page synthesizing unit of the PC according to the first embodiment.

FIG. 5 is a diagram illustrating an example of combination of print data performed by the page synthesizing unit 117 according to the first embodiment. FIG. 5 illustrates an example in which the page synthesizing unit 117 of the PC 100 according to the first embodiment combines the print data of the first page (i.e., a letter "A") with each of the print data of the second page (i.e., a letter "B") and the print data of the third page (i.e., a letter "C").

As illustrated in FIG. 5, the color converting unit 114 converts the print data of the first page into print data 501, which is the print data for the K toner (i.e., stealth toner) described as a PDL command. The color converting unit 114 further converts the print data of the second and third pages into print data 500, which is the print data for the CMY toners described as PDL commands. The print data 500 includes a description 500A representing the print data of the second page and a description 500B representing the print data of the third page.

As illustrated in FIG. 5, the page synthesizing unit 117 embeds the print data 501 in each of the descriptions 500A and 500B of the print data 500. Thereby, the page synthesizing unit 117 combines the print data of the first page with each of the print data of the second page and the print data of the third page.

Consequently, the printer 150 first prints the print data of the second page (i.e., the letter "B") on a first print medium with the CMY toners, and then prints the print data of the first page (i.e., the letter "A") on the first print medium with the stealth toner such that the print data of the first page is superimposed on the print data of the second page.

The printer 150 then prints the print data of the third page (i.e., the letter "C") on a second print medium with the CMY toners, and then prints the print data of the first page (i.e., the letter "A") on the second print medium with the stealth toner such that the print data of the first page is superimposed on the print data of the third page.

As illustrated in FIG. 5, the page synthesizing unit 117 preferably embeds a PDL command for printing with the K toner (i.e., stealth toner) after a PDL command for printing with the CMY toners to perform the printing with the K toner (i.e., stealth toner) after the printing with the CMY toners for each of the second and third pages. This is because effects of the stealth toner are enhanced by making the printing with the CMY toners precede the printing with the K toner (i.e., stealth toner) when superimposing a print of the CMY toners and a print of the K toner (i.e., stealth toner) upon each other.

A second embodiment of the present invention will now be described with reference to FIG. 6. The following description will focus on differences from the first embodiment.

In the first embodiment, each of the printers 150 stores the stealth toner in place of the K toner. In the second embodiment, each of the printers 150 stores the stealth toner in place of one of the CMY toners. In the following example, each of the printers 150 stores the stealth toner in place of the M toner, for instance.

A sequence of processes performed by the information processing system 10 according to the second embodiment will be described.

Figure 6:
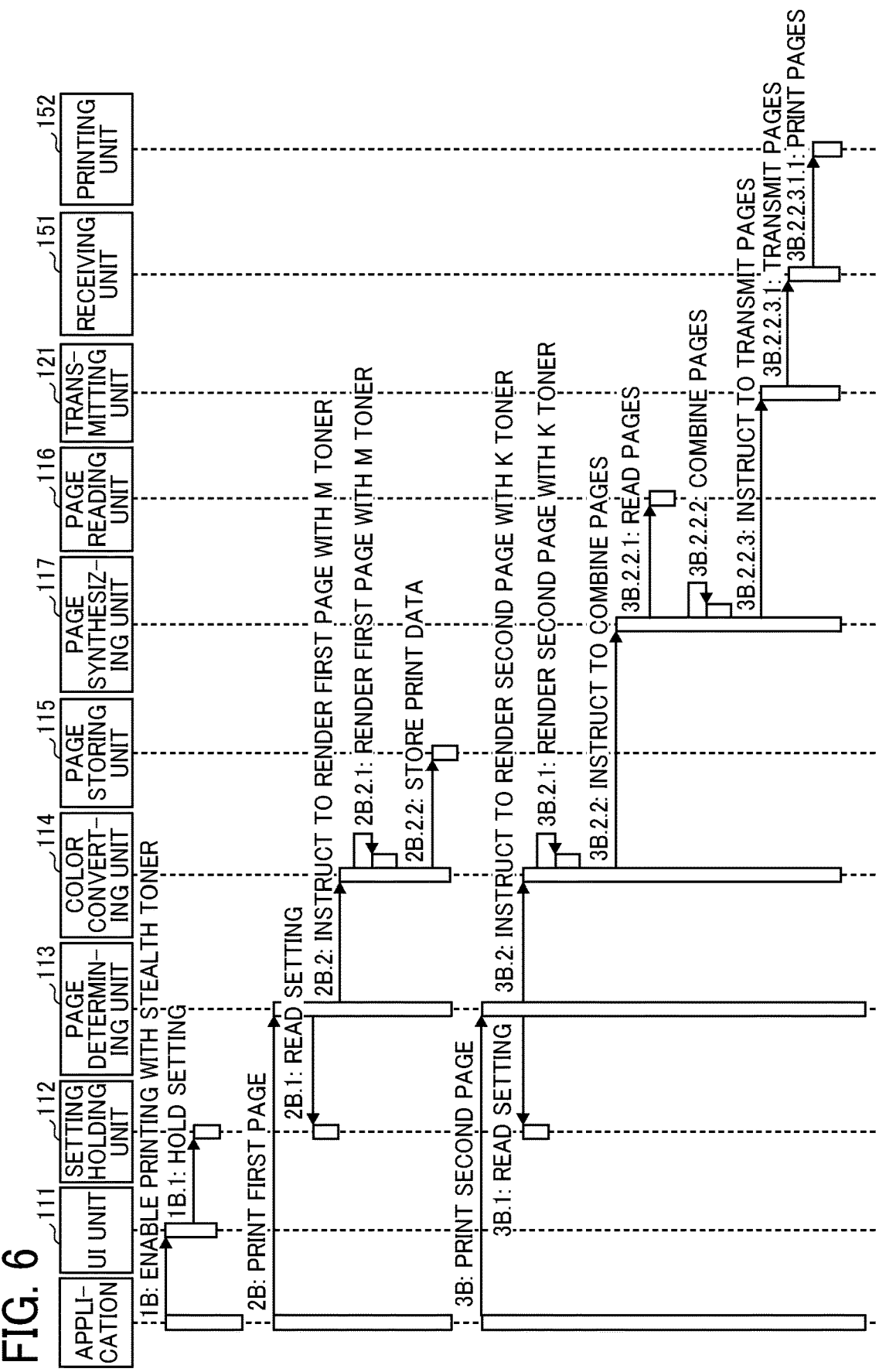
FIG. 6 is a diagram illustrating a sequence of processes performed by an information processing system according to a second embodiment of the present invention.

FIG. 6 is a diagram illustrating a sequence of processes performed by the information processing system 10 according to the second embodiment.

In sequence 1B, the stealth toner print function is first turned ON by the application via the UI unit 111 in the PC 100. This setting of the stealth toner print function is made on the UI screen 300 illustrated in FIG. 3, for example, and is held in the setting holding unit 112 (sequence 1B.1).

In sequence 2B, in response to the print data of the first page transmitted from the application, the page determining unit 113 reads the setting of the stealth toner print function from the setting holding unit 112 (sequence 2B.1). If the setting is ON, the page determining unit 113 instructs the color converting unit 114 to print the print data of the first page with the M toner (i.e., stealth toner) (sequence 2B.2).

In accordance with this instruction, the color converting unit 114 converts the print data of the first page into the print data for the M toner (i.e., stealth toner) (sequence 2B.2.1). For example, the color converting unit 114 converts the print data of the first page into monochrome data with the conversion formula $Y=0.299R+0.587G+0.114B$, to thereby generate the print data for the M toner (i.e., stealth toner). If the print data of the first page is already monochrome data, however, the color converting unit 114 directly uses the print data of the first page as the print data for the M toner (i.e., stealth toner). The color converting unit 114 then converts the print data for the M toner (i.e., stealth toner) into the print data in the PDL command format. The color converting unit 114 may not perform image processing such as color matching and dithering on the print data for the M toner (i.e., stealth toner).

After having generated the print data for the M toner, the color converting unit 114 stores the print data in the page storing unit 115 (sequence 2B.2.2). The storage destination of the print data may be a predetermined folder in the HDD obtainable with the GetTempPath function of the Windows OS, for example.

In sequence 3B, in response to the print data of the second page transmitted from the application, the page determining unit 113 reads the setting of the stealth toner print function from the setting holding unit 112 (sequence 3B.1). If the setting is ON, the page determining unit 113 instructs the color converting unit 114 to print the print data of the second page with the K toner (sequence 3B.2).

In accordance with this instruction, the color converting unit 114 converts the print data of the second page into the print data for the K toner (sequence 3B.2.1). After having generated the print data for the K toner, the color converting unit 114 instructs the page synthesizing unit 117 to combine the print data for the M toner with the print data for the K toner (sequence 3B.2.2). In accordance with this instruction, the page synthesizing unit 117 reads the print data for the M toner from the predetermined storage destination (sequence 3B.2.2.1), and combines the print data for the M toner with the print data for the K toner (sequence 3B.2.2.2). In this process, the page synthesizing unit 117 preferably combines the print data such that the printing with the M toner (i.e., stealth toner) follows the printing with the K toner, similarly as in the first embodiment illustrated in FIG. 5.

The page synthesizing unit 117 then instructs the transmitting unit 121 to transmit the print data for the K toner combined with the print data for the M toner (sequence 3B.2.2.3). In accordance with this instruction, the transmitting unit 121 transmits the print data for the K toner combined with the print data for the M toner to the printer 150 (sequence 3B.2.2.3.1).

In the printer 150, the receiving unit 151 receives the print data transmitted from the PC 100, and the printing unit 152 prints an image on a print medium based on the print data (sequence 3B.2.2.3.1.1). Specifically, for each of the second and subsequent pages, the printing unit 152 uses the K toner to print the print data originally included in the each of the second and subsequent pages, and uses the stealth toner, which is stored in the printer 150 in place of the M toner, to print the print data of the first page combined with the print data of the each of the second and subsequent pages.

With the above-described sequence of processes, the printer 150 prints the print data of the second page on the print medium with the K toner, and prints the print data of the first page over the print data of the second page with the stealth toner. In the above sequence of processes, the print data of the first page is printed over the print data of each of the third and subsequent pages, similarly as over the print data of the second page. Further, when the setting of the stealth toner print function is OFF in the above sequence of processes, the printer 150 performs normal printing with the K toner for all print pages.

In the above-described example of the color printer storing the toners of four colors C, M, Y, and K, a toner bottle storing the toner of the C, M, Y, or K color is replaced by a toner bottle storing the stealth toner. However, the present invention is not limited to this example, and may be applied to a monochrome printer capable of outputting the K toner and the stealth toner, for example. That is, a monochrome printer originally not storing the M toner is capable of outputting the stealth toner by converting the image that is supposed to be printed with the stealth toner into the print data for the M toner. In other words, the image data rendered in the K color is output with the K toner, and the image data rendered in the M color is output with the stealth toner. Although conversion into the print data for the M toner is executed in the above-described example, conversion into print data for the Y or C toner may be executed.

A third embodiment of the present invention will now be described with reference to FIGS. 7 to 11. The following description will focus on differences from the first embodiment. In the above-described first embodiment, the print data for the stealth toner is generated from the print data of the first page. In the third embodiment, a description will be given of a configuration example allowing the user to set, as desired, the page from which the print data for the stealth toner is to be generated.

Figure 7:
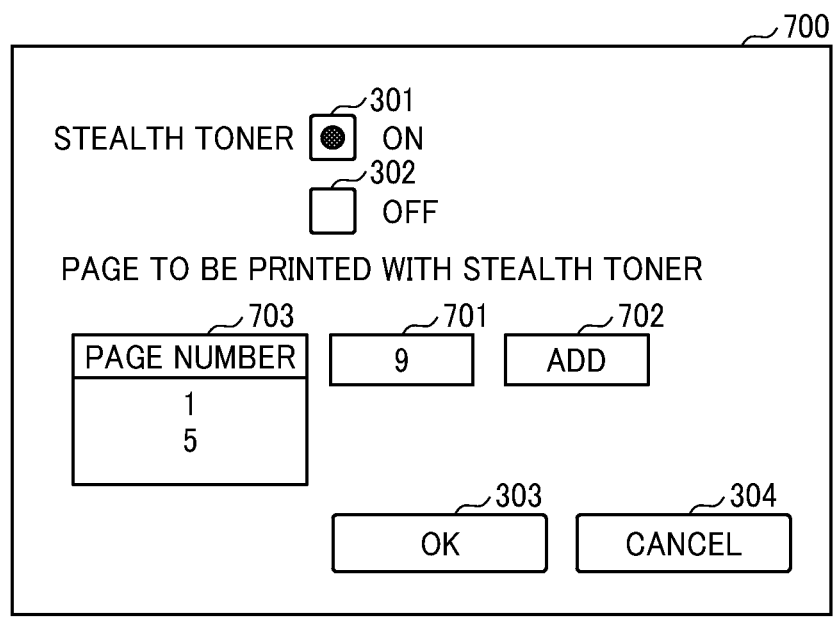
FIG. 7 is a diagram illustrating an example of a UI screen displayed on a PC of an information processing system according to a third embodiment of the present invention.

FIG. 7 is a diagram illustrating an example of a UI screen displayed on the PC 100 according to the third embodiment. A UI screen 700 illustrated in FIG. 7 is a setting screen displayed on the display of the PC 100 under the control of the UI unit 111 to allow the user to switch between ON and OFF of the stealth toner print function and set the page from which the print data for the stealth toner is to be generated. As illustrated in FIG. 7, the UI screen 700 corresponds to the UI screen 300 of the first embodiment in FIG. 3 further including an input field 701, an add button 702, and a page number display field 703. For example, if the add button 702 is pressed with a given page number (e.g., "9" in the example of FIG. 7) input in the input field 701 on the thus-configured UI screen 700, the page number is additionally displayed in the page number display field 703. Further, if the OK button 303 is pressed, the page number displayed in the page number display field 703 at the time of pressing the OK button 303 is confirmed as the page number of the page from which the print data for the stealth toner is to be generated. Then, the setting holding unit 112 holds setting information indicating that the page number displayed in the page number display field 703 has been confirmed as the page number of the page from which the print data for the stealth toner is to be generated.

In the third embodiment, a page set on the UI screen 700 is the page from which the print data for the stealth toner is to be generated, and a page subsequent thereto is the page from which the print data for the CMY toners is to be generated. Further, the print data for the stealth toner is combined with the print data for the CMY toners. For example, if the print data of seven pages is input when page numbers "1" and "5" are set on the UI screen 700, as illustrated in FIG. 7, the print data for the stealth toner generated from the print data of the first page is combined with the print data for the CMY toners generated from the print data of the second to fourth pages. Further, the print data for the stealth toner generated from the print data of the fifth page is combined with the print data for the CMY toners generated from the print data of the sixth and seventh pages.

A sequence of processes performed by the information processing system 10 according to the third embodiment will be described.

Figure 8A:
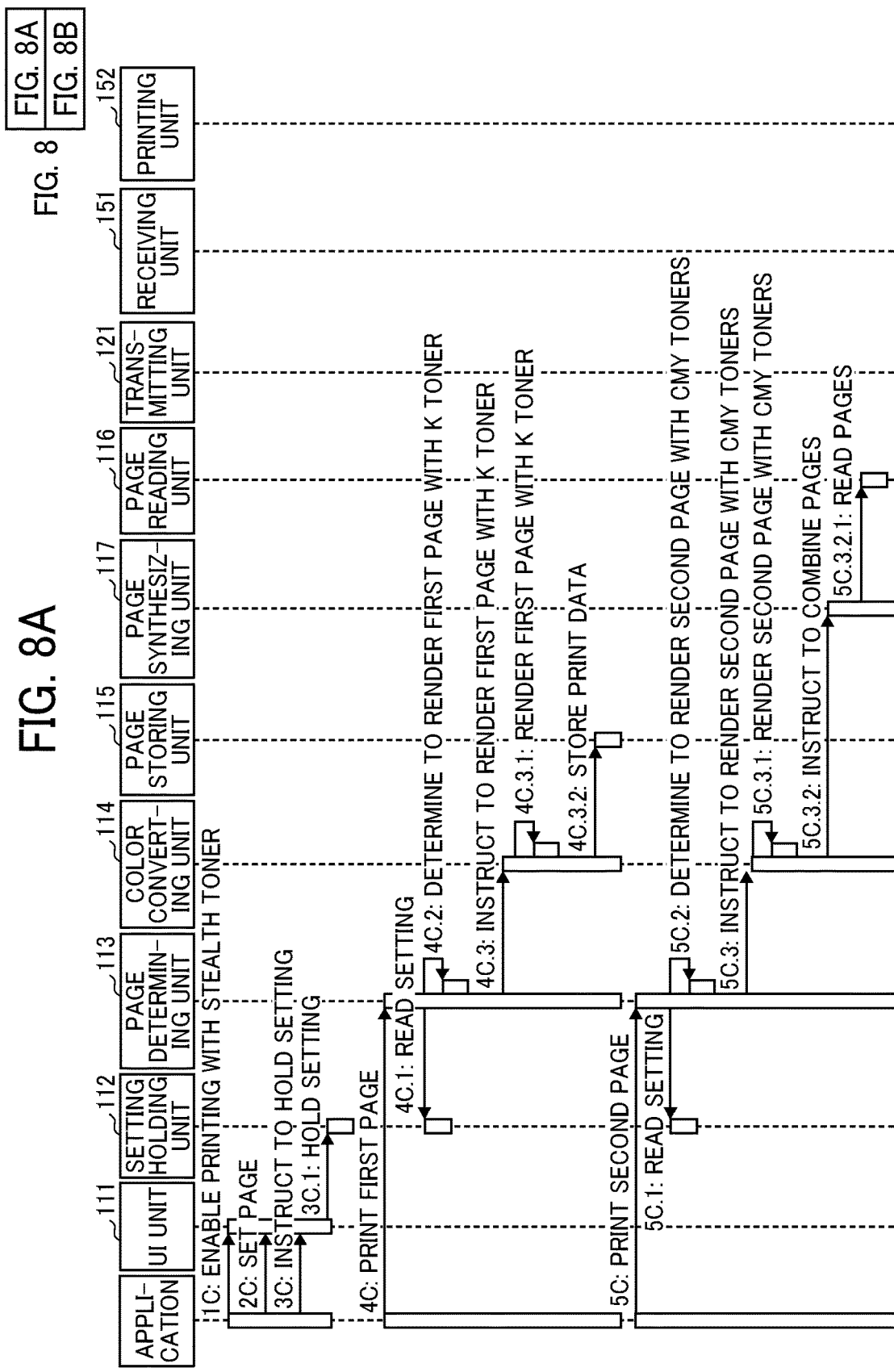
FIGS. 8A and 8B are a diagram illustrating a sequence of processes performed by the information processing system according to the third embodiment.
Figure 8B:
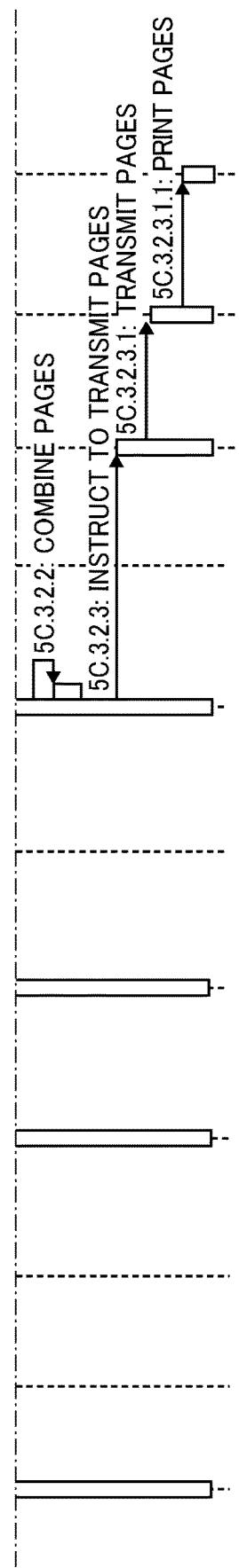

FIGS. 8A and 8B are a diagram illustrating a sequence of processes performed by the information processing system 10 according to the third embodiment.

In sequence 1C, the stealth toner print function is first turned ON by the application via the UI unit 111 in the PC 100. This setting of the stealth toner print function is made on the UI screen 700 illustrated in FIG. 7, for example.

In sequence 2C, the page from which the print data for the stealth toner is to be generated is set by the application via the UI unit 111. This setting of the page is made on the UI screen 700 illustrated in FIG. 7, for example.

In sequence 3C, in accordance with an instruction from the application to the UI unit 111 to hold the above-described settings, the UI unit 111 stores these settings in the setting holding unit 112 (sequence 3C.1).

In sequence 4C, in response to the print data of the first page transmitted from the application, the page determining unit 113 reads the setting information from the setting holding unit 112 (sequence 4C.1). If the setting information indicates that the stealth toner print function is ON, and that the number "1" is set as the page number of the page from which the print data for the stealth toner is to be generated, as illustrated in the UI screen 700 of FIG. 7, for example, the page determining unit 113 determines to print the print data of the first page with the K toner (i.e., stealth toner) (sequence 4C.2), and instructs the color converting unit 114 to print the print data of the first page with the K toner (i.e., stealth toner) (sequence 4C.3).

In accordance with this instruction, the color converting unit 114 converts the print data of the first page into the print data for the K toner (i.e., stealth toner) (sequence 4C.3.1). For example, the color converting unit 114 converts the print data of the first page into monochrome data with the conversion formula $Y=0.299R+0.587G+0.114B$, to thereby generate the print data for the K toner (i.e., stealth toner). If the print data of the first page is already monochrome data, however, the color converting unit 114 directly uses the print data of the first page as the print data for the K toner (i.e., stealth toner). The color converting unit 114 then converts the print data for the K toner (i.e., stealth toner) into the print data in the PDL command format. The color converting unit 114 may not perform image processing such as color matching and dithering on the print data for the K toner (i.e., stealth toner).

After having generated the print data for the K toner, the color converting unit 114 stores the print data in the page storing unit 115 (sequence 4C.3.2). The storage destination of the print data may be a predetermined folder in the HDD obtainable with the GetTempPath function of the Windows OS, for example. If the print data for the K toner is already stored at the predetermined storage destination, the color converting unit 114 overwrites the stored print data for the K toner with the newly generated print data for the K toner.

In sequence 5C, in response to the print data of the second page transmitted from the application, the page determining unit 113 reads the setting information from the setting holding unit 112 (sequence 5C.1). If the setting information indicates that the stealth toner print function is ON, and that the number "2" is not set as the page number of the page from which the print data for the stealth toner is to be generated, as illustrated in the UI screen 700 of FIG. 7, for example, the page determining unit 113 determines to print the print data of the second page with the CMY toners (sequence 5C.2), and instructs the color converting unit 114 to print the print data of the second page with the CMY toners (sequence 5C.3).

In accordance with this instruction, the color converting unit 114 converts the print data of the second page into the print data for the CMY toners (sequence 5C.3.1). In this process, the color converting unit 114 uses the CMY toners to print a black area in the second page, which originally should be printed with the K toner. For example, it is possible to express black color by using the CMY toners with the respective densities thereof set to be equal.

After having generated the print data for the CMY toners, the color converting unit 114 instructs the page synthesizing unit 117 to combine the print data for the K toner with the print data for the CMY toners (sequence 5C.3.2). In accordance with this instruction, the page synthetizing unit 117 reads the print data for the K toner from the predetermined storage destination (sequence 5C.3.2.1), and combines the print data for the K toner with the print data for the CMY toners (sequence 5C.3.2.2). In this process, the page synthetizing unit 117 preferably combines the print data such that the printing with the K toner (i.e., stealth toner) follows the printing with the CMY toners, similarly as in the first embodiment illustrated in FIG. 5.

The page synthesizing unit 117 then instructs the transmitting unit 121 to transmit the print data for the CMY toners combined with the print data for the K toner (sequence 5C.3.2.3). In accordance with this instruction, the transmitting unit 121 transmits the print data for the CMY toners combined with the print data for the K toner to the printer 150 (sequence 5C.3.2.3.1).

In the printer 150, the receiving unit 151 receives the print data transmitted from the PC 100, and the printing unit 152 prints an image on a print medium based on the print data (sequence 5C.3.2.3.1.1). Specifically, for each of the second and subsequent pages, the printing unit 152 uses the CMY toners to print the print data originally included in the each of the second and subsequent pages, and uses the stealth toner, which is stored in the printer 150 in place of the K toner, to print the print data of the first page combined with the print data of the each of the second and subsequent pages.

It is now assumed that the print data of seven pages is input when the stealth toner print function is ON and the numbers "1" and "5" are set as the page numbers of the pages from which the print data for the stealth toner is to be generated, as illustrated in the UI screen 700 of FIG. 7, for example. In this case, in accordance with the above-described sequence of processes, the print data of the fifth page is subjected to a process similar to that for the print data of the first page, and the print data of the third, fourth, sixth, and seventh pages are subjected to a process similar to that for the print data of the second page. Consequently, the printer 150 prints the print data of the second to fourth pages on print media with the CMY toners, and prints the print data of the first page over the print data of the second to fourth pages with the stealth toner. The printer 150 further prints the print data of the sixth and seventh pages on print media with the CMY toners, and prints the print data of the fifth page over the print data of the sixth and seventh pages with the stealth toner. Further, when the setting of the stealth toner print function is OFF in the above sequence of processes, the printer 150 performs normal printing with the CMY toners for all print pages.

A processing procedure of the PC 100 according to the third embodiment will be described.

FIG. 9 is a flowchart illustrating a processing procedure of the PC 100 according to the third embodiment. For example, the PC 100 performs the sequence of processes illustrated in FIG. 9 for each page of the print data transmitted from the application.

The page determining unit 113 first determines whether the page of the print data input from the application is the page to be printed with the K toner (i.e., stealth toner) (step S901). For example, if the setting information held in the setting holding unit 112 (i.e., the setting of the page from which the print data for the stealth toner is to be generated) includes the page number of the input page, the page determining unit 113 determines that the input page is the page to be printed with the K toner (i.e., stealth toner).

If it is determined at step S901 that the input page is not the page to be printed with the K toner (i.e., stealth toner) (NO at step S901), the color converting unit 114 generates the print data for the CMY toners from the print data of the input page (step S902). Then, the PC 100 completes the sequence of processes illustrated in FIG. 9.

If it is determined at step S901 that the input page is the page to be printed with the K toner (i.e., stealth toner) (YES at step S901), the color converting unit 114 generates the print data for the K toner (i.e., stealth toner) from the print data of the input page (step S903).

Then, the color converting unit 114 determines whether the print data for the K toner (i.e., stealth toner) is already stored at the predetermined storage destination (step S904).

If it is determined at step S904 that the print data for the K toner (i.e., stealth toner) is not yet stored at the predetermined storage destination (NO at step S904), the color converting unit 114 newly stores the print data generated at step S903 at the predetermined storage destination (step S905). Then, the PC 100 completes the sequence of processes illustrated in FIG. 9.

If it is determined at step S904 that the print data for the K toner (i.e., stealth toner) is already stored at the predetermined storage destination (YES at step S904), the color converting unit 114 overwrites the print data for the K toner already stored at the predetermined storage destination with the print data generated at step S903 (step S906). Then, the PC 100 completes the sequence of processes illustrated in FIG. 9.

A modified example of the UI screen 700 of the PC 100 according to the third embodiment will be described.

Figure 10:
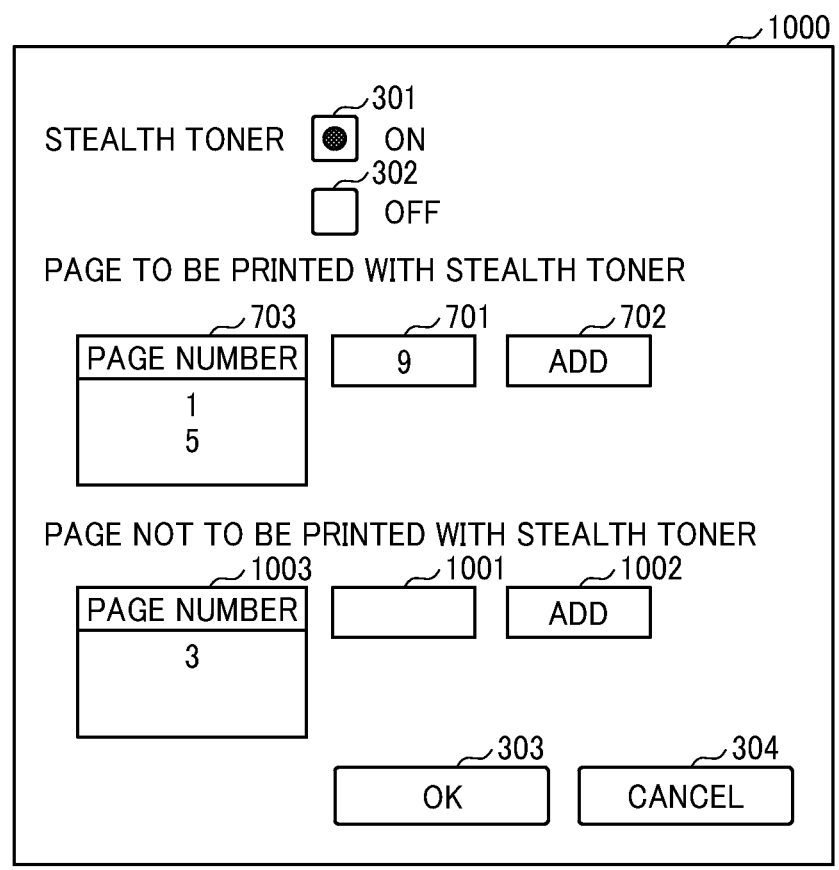
FIG. 10 is a diagram illustrating a modified example of the UI screen displayed on the PC according to the third embodiment.

FIG. 10 is a diagram illustrating a modified example of the UI screen 700 of the PC 100 according to the third embodiment. A UI screen 1000 illustrated in FIG. 10 is a setting screen displayed on the display of the PC 100 under the control of the UI unit 111. The UI screen 1000 allows the user to switch between ON and OFF of the stealth toner print function, set the page from which the print data for the stealth toner is to be generated, and set the page that is not to be combined with the print data for the stealth toner. As illustrated in FIG. 10, the UI screen 1000 corresponds to the UI screen 700 in FIG. 7 further including an input field 1001, an add button 1002, and a page number display field 1003. For example, if the add button 1002 is pressed with a given page number input in the input field 1001 on the thus-configured UI screen 1000, the page number is additionally displayed in the page number display field 1003. Further, if the OK button 303 is pressed, the page number displayed in the page number display field 1003 at the time of pressing the OK button 303 is confirmed as the page number of the page that is not to be combined with the print data for the stealth toner. Then, the setting holding unit 112 holds setting information indicating that the page number displayed in the page number display field 1003 has been confirmed as the page number of the page that is not to be combined with the print data for the stealth toner.

In this modified example of the third embodiment, a page set in the page number display field 703 of the UI screen 1000 is the page from which the print data for the stealth toner is to be generated, and a page subsequent thereto is the page from which the print data for the CMY toners is to be generated. Further, a page set in the page number display field 1003 of the UI screen 1000 is the page that is not to be combined with the print data for the stealth toner. For example, if the print data of seven pages is input when page numbers "1" and "5" are set in the page number display field 703 of the UI screen 1000 and page number "3" is set in the page number display field 1003 of the UI screen 1000, as illustrated in FIG. 10, the print data for the stealth toner generated from the print data of the first page is combined with the print data for the CMY toners generated from the print data of the second and fourth pages. Further, the print data for the stealth toner generated from the print data of the fifth page is combined with the print data for the CMY toners generated from the print data of the sixth and seventh pages.

A modified example of the processing procedure of the PC 100 according to the third embodiment will be described.

Figure 11:
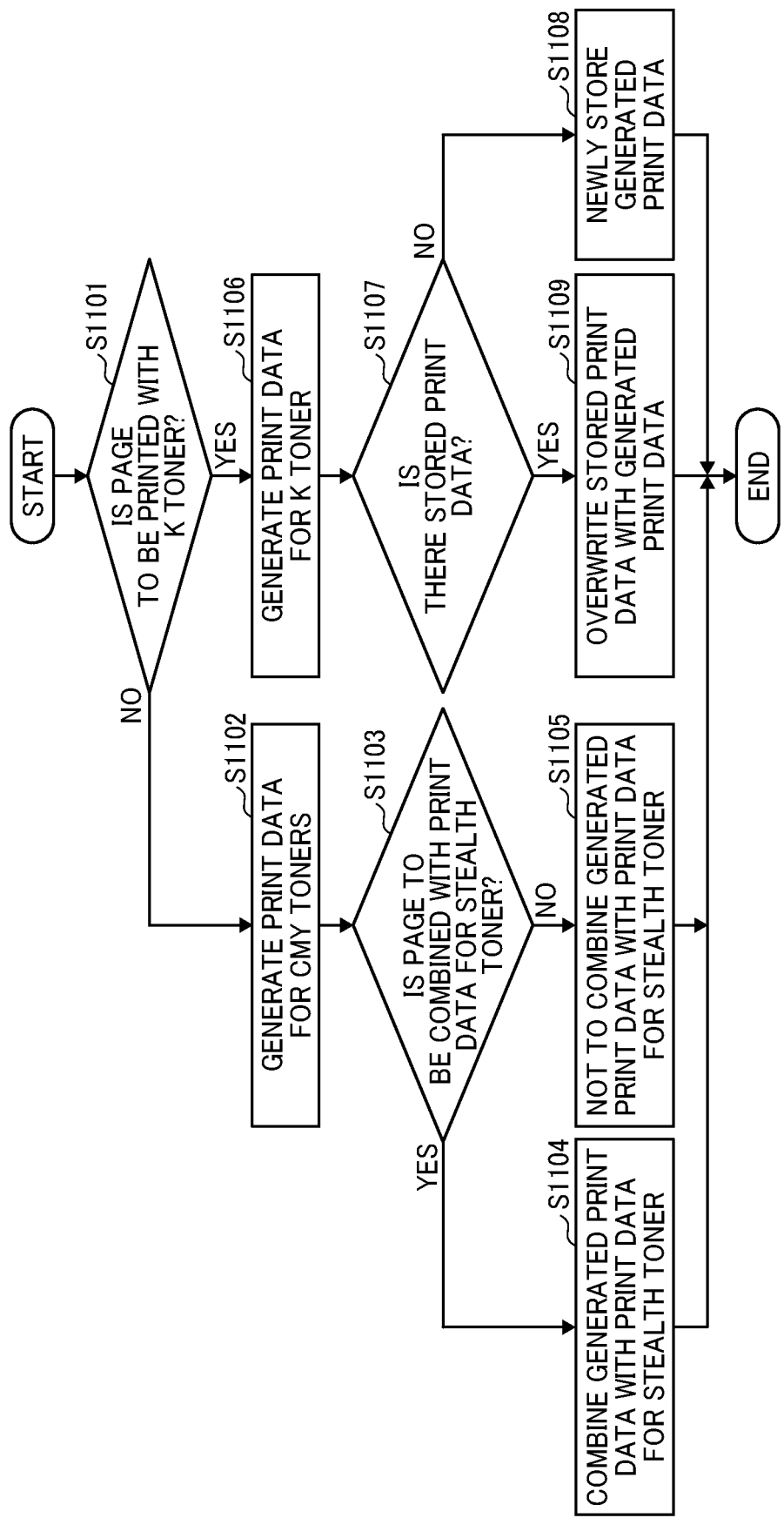
FIG. 11 is a flowchart illustrating a modified example of the processing procedure of the PC according to the third embodiment.

FIG. 11 is a flowchart illustrating a modified example of the processing procedure of the PC 100 according to the third embodiment. In this modified example, for instance, the PC 100 performs the sequence of processes in FIG. 11 for each page of the print data transmitted from the application.

The page determining unit 113 first determines whether the page of the print data input from the application is the page to be printed with the K toner (i.e., stealth toner) (step S1101). For example, if the setting information held in the setting holding unit 112 (i.e., the setting of the page from which the print data for the stealth toner is to be generated) includes the page number of the input page, the page determining unit 113 determines that the input page is the page to be printed with the K toner (i.e., stealth toner).

If it is determined at step S1101 that the input page is not the page to be printed with the K toner (i.e., stealth toner) (NO at step S1101), the color converting unit 114 generates the print data for the CMY toners from the print data of the input page (step S1102).

Then, the page synthesizing unit 117 determines whether the input page is the page that is to be combined with the print data for the stealth toner (step S1103). For example, if the page number of the input page is not included in the setting information held in the setting holding unit 112 (i.e., the setting of the page that is not to be combined with the print data for the stealth toner), the page synthesizing unit 117 determines that the input page is the page that is to be combined with the print data for the stealth toner. If the page number of the input page is included in the setting information, i.e., the setting of the page that is not to be combined with the print data for the stealth toner, the page synthesizing unit 117 determines that the input page is the page that is not to be combined with the print data for the stealth toner.

If it is determined at step S1103 that the input page is the page that is to be combined with the print data for the stealth toner (YES at step S1103), the page synthesizing unit 117 combines the print data for the stealth toner stored at the predetermined storage destination with the print data generated at step S1102 (step S1104). Then, the PC 100 completes the sequence of processes illustrated in FIG. 11.

If it is determined at step S1103 that the input page is not the page that is to be combined with the print data for the stealth toner (NO at step S1103), the page synthesizing unit 117 does not combine the print data for the stealth toner stored at the predetermined storage destination with the print data generated at step S1102 (step S1105). Then, the PC 100 completes the sequence of processes illustrated in FIG. 11.

If it is determined at step S1101 that the input page is the page to be printed with the K toner (i.e., stealth toner) (YES at step S1101), the color converting unit 114 generates the print data for the K toner (i.e., stealth toner) from the print data of the input page (step S1106).

Then, the color converting unit 114 determines whether the print data for the K toner (i.e., stealth toner) is already stored at the predetermined storage destination (step S1107).

If it is determined at step S1107 that the print data for the K toner (i.e., stealth toner) is not yet stored at the predetermined storage destination (NO at step S1107), the color converting unit 114 newly stores the print data generated at step S1106 at the predetermined storage destination (step S1108). Then, the PC 100 completes the sequence of processes illustrated in FIG. 11.

If it is determined at step S1107 that the print data for the K toner (i.e., stealth toner) is already stored at the predetermined storage destination (YES at step S1107), the color converting unit 114 overwrites the print data for the K toner stored at the predetermined storage destination with the print data generated at step S1106 (step S1109). Then, the PC 100 completes the sequence of processes illustrated in FIG. 11.

A fourth embodiment of the present invention will now be described with reference to FIGS. 12 and 13. The following description will focus on differences from the first embodiment. In the above-described first embodiment, the print data for the stealth toner is generated from the print data of the first page. In the fourth embodiment, a description will be given of a configuration example allowing the user to determine the page from which the print data for the stealth toner is to be generated by setting a desired character string.

A functional configuration of the information processing system 10 according to the fourth embodiment will first be described.

Figure 12:
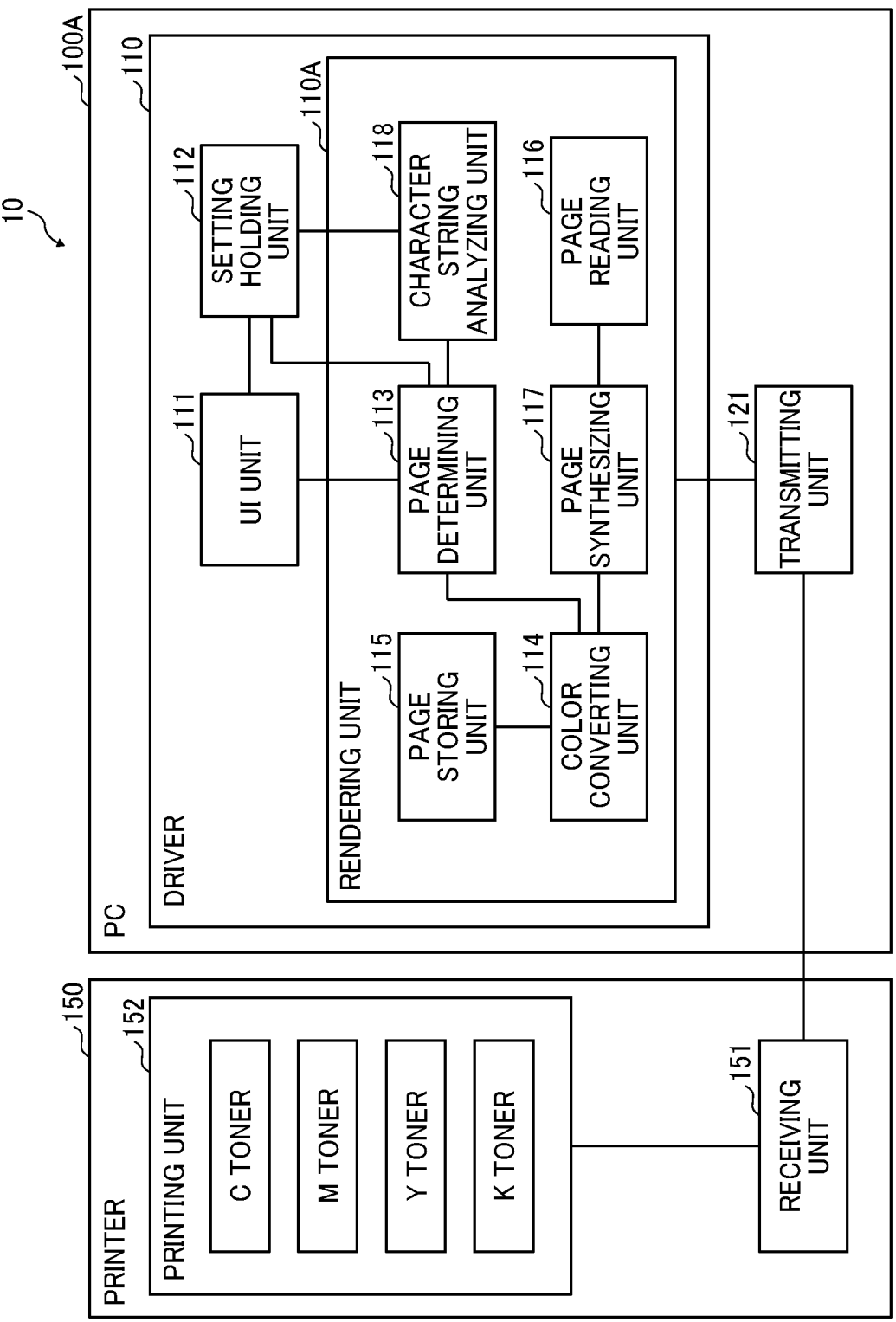
FIG. 12 is a diagram illustrating a functional configuration of an information processing system according to a fourth embodiment of the present invention.

FIG. 12 is a diagram illustrating a functional configuration of the information processing system 10 according to the fourth embodiment. The information processing system 10 of the fourth embodiment is different from information processing system 10 of the first embodiment in that the PC 100 is replaced by a PC 100A. The PC 100A is different from the PC 100 in further including a character string analyzing unit 118 in the rendering unit 110A.

The character string analyzing unit 118 performs a known character string analysis process on the print data transmitted from the application to determine whether the print data includes a character string for determining the page from which the print data for the stealth toner is to be generated. The character string for determining the page from which the print data for the stealth toner is to be generated is set on a UI screen 1300 illustrated in FIG. 13, for example, and is held in the setting holding unit 112.

An example of a UI screen displayed on the PC 100A according to the fourth embodiment will be described.

Figure 13:
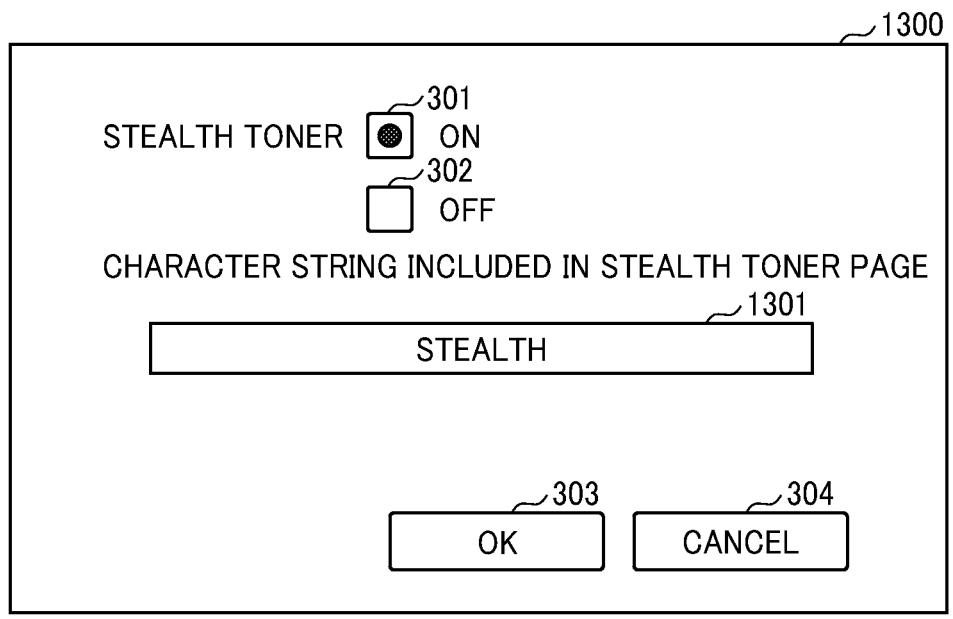
FIG. 13 is a diagram illustrating an example of a UI screen displayed on a PC of the information processing system according to the fourth embodiment.

FIG. 13 is a diagram illustrating an example of the UI screen displayed on the PC 100A according to the fourth embodiment. The UI screen 1300 illustrated in FIG. 13 is a setting screen displayed on a display of the PC 100A under the control of the UI unit 111. The UI screen 1300 allows the user to switch between ON and OFF of the stealth toner print function and set the character string for determining the page from which the print data for the stealth toner is to be generated. As illustrated in FIG. 13, the UI screen 1300 corresponds to the UI screen 300 of the first embodiment in FIG. 3 further including an input field 1301. For example, if the OK button 303 is pressed with a given character string (e.g., "STEALTH" in the example of FIG. 13) input in the input field 1301 on the thus-configured UI screen 1300, the character string input in the input field 1301 at the time of pressing the OK button 303 is confirmed as the character string for determining the page from which the print data for the stealth toner is to be generated. Further, the setting holding unit 112 holds setting information indicating that the character string input in the input field 1301 has been confirmed as the character string for determining the page from which the print data for the stealth toner is to be generated.

In the fourth embodiment, a page including a predetermined character string set on the UI screen 1300 is the page from which the print data for the stealth toner is to be generated, and a page subsequent thereto is the page from which the print data for the CMY toners is to be generated. Further, the print data for the stealth toner is combined with the page from which the print data for the CMY toners is generated. For example, if the print data of seven pages is input when a character string "STEALTH" is set as the predetermined character string on the UI screen 1300, as illustrated in FIG. 13, and if the predetermined character string "STEALTH" is included in the print data of the first and fifth pages, the print data for the stealth toner generated from the print data of the first page is combined with the print data for the CMY toners generated from the print data of the second to fourth pages. Further, the print data for the stealth toner generated from the print data of the fifth page is combined with the print data for the CMY toners generated from the print data of the sixth and seventh pages.

A sequence of processes performed by the information processing system 10 according to the fourth embodiment will be described.

Figure 14B:
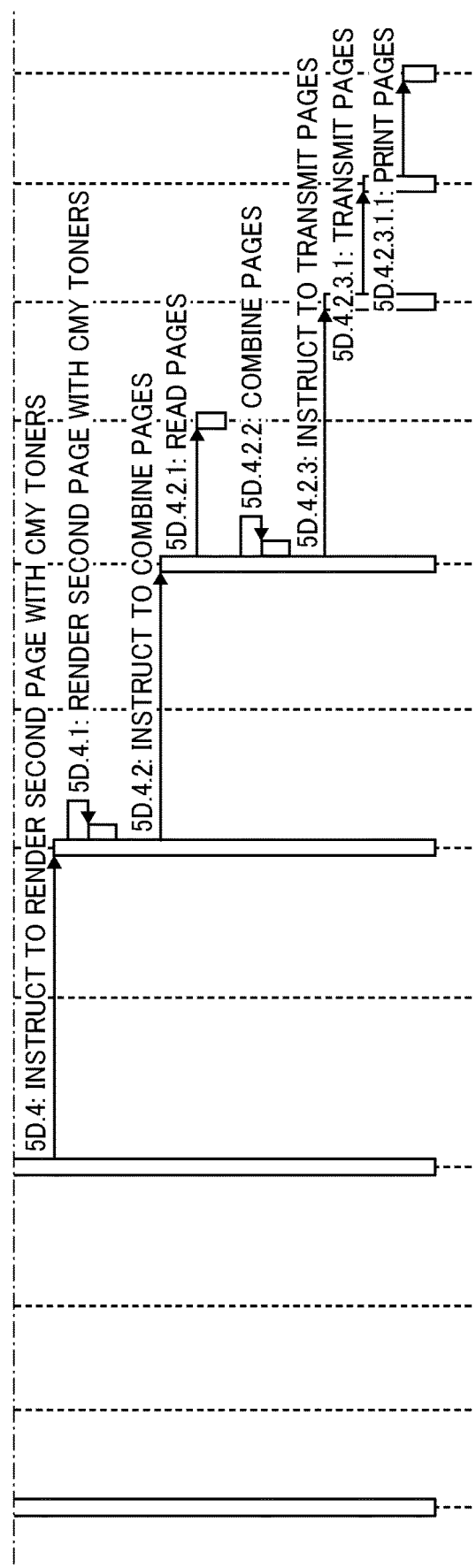

FIGS. 14A and 14B are a diagram illustrating a sequence of processes performed by the information processing system 10 according to the fourth embodiment.

In sequence 1D, the stealth toner print function is first turned ON by the application via the UI unit 111 in the PC 100A. This setting of the stealth toner print function is made on the UI screen 1300 illustrated in FIG. 13, for example.

In sequence 2D, the character string for determining the page from which the print data for the stealth toner is to be generated is set by the application via the UI unit 111. This setting of the character string is made on the UI screen 1300 illustrated in FIG. 13, for example.

In sequence 3D, in accordance with an instruction from the application to the UI unit 111 to hold the above-described settings, the UI unit 111 stores these settings in the setting holding unit 112 (sequence 3D.1).

In sequence 4D, in response to the print data of the first page transmitted from the application, the page determining unit 113 reads the setting information (i.e., the predetermined character string for determining the page from which the print data for the stealth toner is to be generated) from the setting holding unit 112 (sequence 4D.1). Then, the character string analyzing unit 118 determines whether the print data of the first page includes the predetermined character string for determining the page from which the print data for the stealth toner is to be generated (sequence 4D.2). It is assumed here that the character string analyzing unit 118 determines that the print data of the first page includes the predetermined character string. In this case, the page determining unit 113 determines to print the print data of the first page with the K toner (i.e., stealth toner) (sequence 4D.3), and instructs the color converting unit 114 to print the print data of the first page with the K toner (i.e., stealth toner) (sequence 4D.4).

In accordance with this instruction, the color converting unit 114 converts the print data of the first page into the print data for the K toner (i.e., stealth toner) (sequence 4D.4.1). For example, the color converting unit 114 converts the print data of the first page into monochrome data with the conversion formula $Y=0.299R+0.587G+0.114B$, to thereby generate the print data for the K toner (i.e., stealth toner). If the print data of the first page is already monochrome data, however, the color converting unit 114 directly uses the print data of the first page as the print data for the K toner (i.e., stealth toner). The color converting unit 114 then converts the print data for the K toner (i.e., stealth toner) into the print data in the PDL command format. The color converting unit 114 may not perform image processing such as color matching and dithering on the print data for the K toner (i.e., stealth toner).

After having generated the print data for the K toner, the color converting unit 114 stores the print data in the page storing unit 115 (sequence 4D.4.2). The storage destination of the print data may be a predetermined folder in the HDD obtainable with the GetTempPath function of the Windows OS, for example. If the print data for the K toner is already stored at the predetermined storage destination, the color converting unit 114 overwrites the stored print data for the K toner with the newly generated print data for the K toner.

In sequence 5D, in response to the print data of the second page transmitted from the application, the page determining unit 113 reads the setting information (i.e., the predetermined character string for determining the page from which the print data for the stealth toner is to be generated) from the setting holding unit 112 (sequence 5D.1). Then, the character string analyzing unit 118 determines whether the print data of the second page includes the predetermined character string for determining the page from which the print data for the stealth toner is to be generated (sequence 5D.2). It is assumed here that the character string analyzing unit 118 determines that the print data of the second page does not include the predetermined character string. In this case, the page determining unit 113 determines to print the print data of the second page with the CMY toners (sequence 5D.3), and instructs the color converting unit 114 to print the print data of the second page with the CMY toners (sequence 5D.4).

In accordance with this instruction, the color converting unit 114 converts the print data of the second page into the print data for the CMY toners (sequence 5D.4.1). In this process, the color converting unit 114 uses the CMY toners to print a black area in the second page, which originally should be printed with the K toner. For example, it is possible to express black color by using the CMY toners with the respective densities thereof set to be equal.

After having generated the print data for the CMY toners, the color converting unit 114 instructs the page synthesizing unit 117 to combine the print data for the K toner with the print data for the CMY toners (sequence 5D.4.2). In accordance with this instruction, the page synthetizing unit 117 reads the print data for the K toner from the predetermined storage destination (sequence 5D.4.2.1), and combines the print data for the K toner with the print data for the CMY toners (sequence 5D.4.2.2). In this process, the page synthetizing unit 117 preferably combines the print data such that the printing with the K toner (i.e., stealth toner) follows the printing with the CMY toners, similarly as in the first embodiment in FIG. 5.

The page synthesizing unit 117 then instructs the transmitting unit 121 to transmit the print data for the CMY toners combined with the print data for the K toner (sequence 5D.4.2.3). In accordance with this instruction, the transmitting unit 121 transmits the print data for the CMY toners combined with the print data for the K toner to the printer 150 (sequence 5D.4.2.3.1).

In the printer 150, the receiving unit 151 receives the print data transmitted from the PC 100A, and the printing unit 152 prints an image on a print medium based on the print data (sequence 5D.4.2.3.1.1). Specifically, for each of the second and subsequent pages, the printing unit 152 uses the CMY toners to print the print data originally included in the each of the second and subsequent pages, and uses the stealth toner, which is stored in the printer 150 in place of the K toner, to print the print data of the first page combined with the print data of the each of the second and subsequent pages.

For example, it is now assumed that the print data of seven pages is input when the stealth toner print function is ON and the character string "STEALTH" is set as the predetermined character string for determining the page from which the print data for the stealth toner is to be generated, as illustrated in the UI screen 1300 of FIG. 13, and that the predetermined character string "STEALTH" is included in the print data of the first and fifth pages. In this case, in accordance with the above-described sequence of processes, the print data of the fifth page is subjected to a process similar to that for the print data of the first page, and the print data of the third, fourth, sixth, and seventh pages are subjected to a process similar to that for the print data of the second page. Consequently, the printer 150 prints the print data of the second to fourth pages on print media with the CMY toners, and prints the print data of the first page over the print data of the second to fourth pages with the stealth toner. Further, the printer 150 prints the print data of the sixth and seventh pages on print media with the CMY toners, and prints the print data of the fifth page over the print data of the sixth and seventh pages with the stealth toner. Further, when the setting of the stealth toner print function is OFF in the above sequence of processes, the printer 150 performs normal printing with the CMY toners for all print pages.

A fifth embodiment of the present invention will now be described with reference to FIGS. 15 and 16. The following description will focus on differences from the first embodiment. In the fifth embodiment, a description will be given of a configuration example allowing the application to directly specify, in the driver 110 of the PC 100, the page from which the print data for the stealth toner is to be generated.

A sequence of processes performed by the information processing system 10 according to the fifth embodiment will be described.

Figure 15:
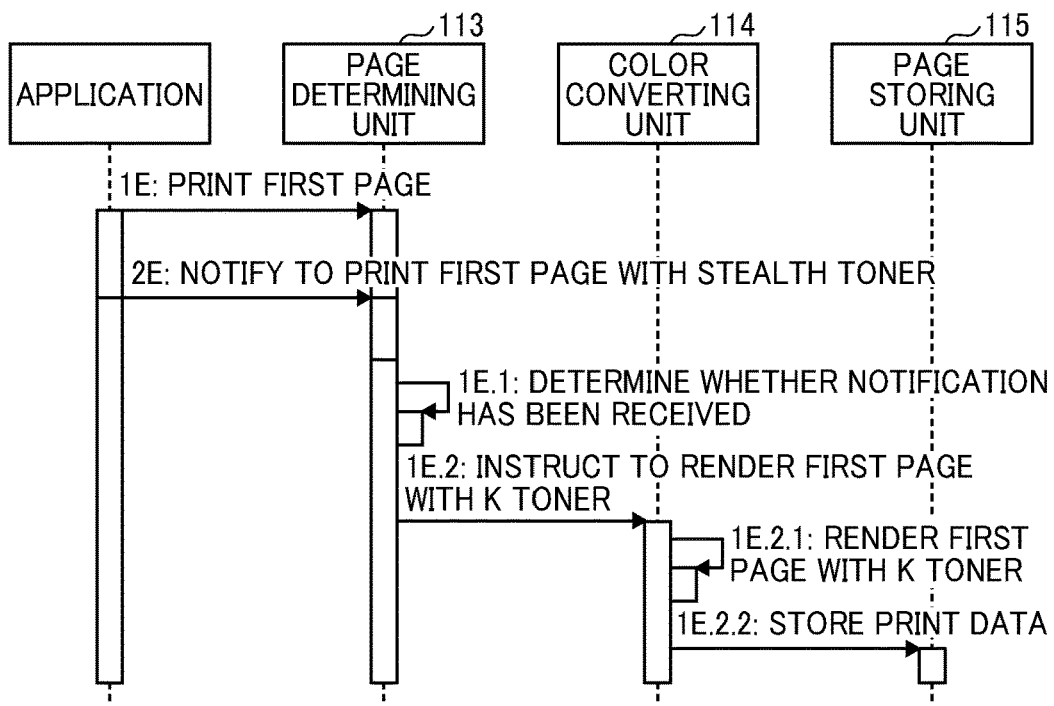
FIG. 15 is a diagram illustrating a sequence of processes performed by an information processing system according to a fifth embodiment of the present invention.

FIG. 15 is a diagram illustrating a sequence of processes performed by the information processing system 10 according to the fifth embodiment. FIG. 15 illustrates a sequence of processes performed when the PC 100 includes the character string analyzing unit 118 illustrated in FIG. 12, and the character string analyzing unit 118 employs a V3 driver for the Windows OS. Herein, the V3 driver refers to a driver using a printer driver architecture introduced from Windows 2000 (registered trademark) onwards.

In the example illustrated in FIG. 15, the character string analyzing unit 118 uses the V3 driver, thereby allowing the application to transmit the print data of the first page to the driver 110 of the PC 100 with a Windows application programming interface (API) (sequence 1E). In this case, the application is capable of notifying, with the Escape function, the driver 110 that the first page is the page from which the print data for the stealth toner is to be generated (sequence 2E).

For example, with the Windows API, the application is capable of notifying the driver 110 of the start of a print page with the StartPage function, and notifying the driver 110 of the end of the print page with the EndPage function. Further, with the Escape function provided between the StartPage function and the EndPage function, the application is capable of notifying the driver 110 that the print page is the page from which the print data for the stealth toner is to be generated. Further, with functions such as the TextOut function and the StrokeFill function provided between the StartPage function and the EndPage function, the application is capable of transmitting rendering data to the driver 110.

The driver 110 (i.e., the page determining unit 113) receives the above-described notifications, and determines, with the Escape function, whether it has been notified that the first page is the page from which the print data for the stealth toner is to be generated (sequence 1E.1). It is assumed here that the page determining unit 113 determines that it has been notified that the first page is the page from which the print data for the stealth toner is to be generated. In this case, the page determining unit 113 determines to print the print data of the first page with the K toner (i.e., stealth toner), and instructs the color converting unit 114 to print the print data of the first page with the K toner (i.e., stealth toner) (sequence 1E.2).

In accordance with this instruction, the color converting unit 114 converts the print data of the first page into the print data for the K toner (i.e., stealth toner) (sequence 1E.2.1). After having generated the print data for the K toner, the color converting unit 114 stores the print data in the page storing unit 115 (sequence 1E.2.2).

In the example illustrated in FIG. 15, the application may transmit the print data for the stealth toner in the PDL format by using the Escape function, instead of notifying, with the Escape function, that the first page is the page from which the print data for the stealth toner is to be generated.

A modified example of the sequence of processes performed by the information processing system 10 according to the fifth embodiment will now be described.

Figure 16:
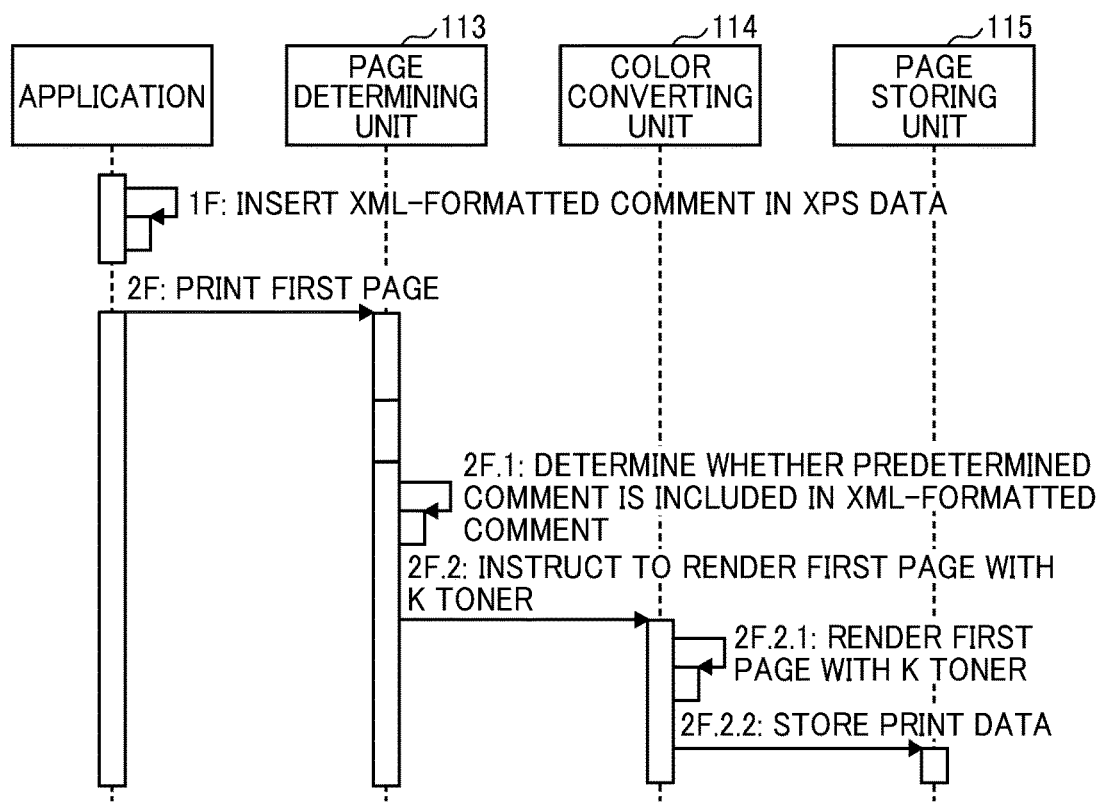
FIG. 16 is a diagram illustrating an modified example of the sequence of processes performed by the information processing system according to the fifth embodiment.

FIG. 16 is a diagram illustrating a modified example of the sequence of processes performed by the information processing system 10 according to the fifth embodiment. FIG. 16 illustrates a sequence of processes performed when the PC 100 includes the character string analyzing unit 118 illustrated in FIG. 12, and the character string analyzing unit 118 employs a V4 driver for the Windows OS. Herein, the V4 driver refers to a driver using a printer driver architecture introduced from Windows 8 (registered trademark) onwards.

In the example illustrated in FIG. 16, the character string analyzing unit 118 uses the V4 driver, thereby allowing the application to generate extensible markup language (XML) paper specification (XPS) data as the print data, insert a predetermined XML-formatted comment in the XPS data to indicate that the XPS data corresponds to the page from which the print data for the stealth toner is to be generated (sequence 1F), and transmit the XPS data to the driver 110 of the PC 100 as the print data of the first page (sequence 2F).

Herein, XPS is an XML-based document format set by Microsoft Corporation. In XPS, text, graphics, and images in each page are defined in XML and integrated into a single document in zip format.

The driver 110 (i.e., the page determining unit 113) receives the XPS data, decodes the XML-formatted comment included in the XPS data, and determines whether a predetermined comment is included in the XML-formatted comment (sequence 2F.1). It is assumed here that the page determining unit 113 determines that the predetermined comment is included in the XML-formatted comment. In this case, the page determining unit 113 determines to print the print data of the first page with the K toner (i.e., stealth toner), and instructs the color converting unit 114 to print the print data of the first page with the K toner (i.e., stealth toner) (sequence 2F.2).

In accordance with this instruction, the color converting unit 114 converts the print data of the first page into the print data for the K toner (i.e., stealth toner) (sequence 2F.2.1). After having generated the print data for the K toner, the color converting unit 114 stores the print data in the page storing unit 115 (sequence 2F.2.2).

Figure 17:
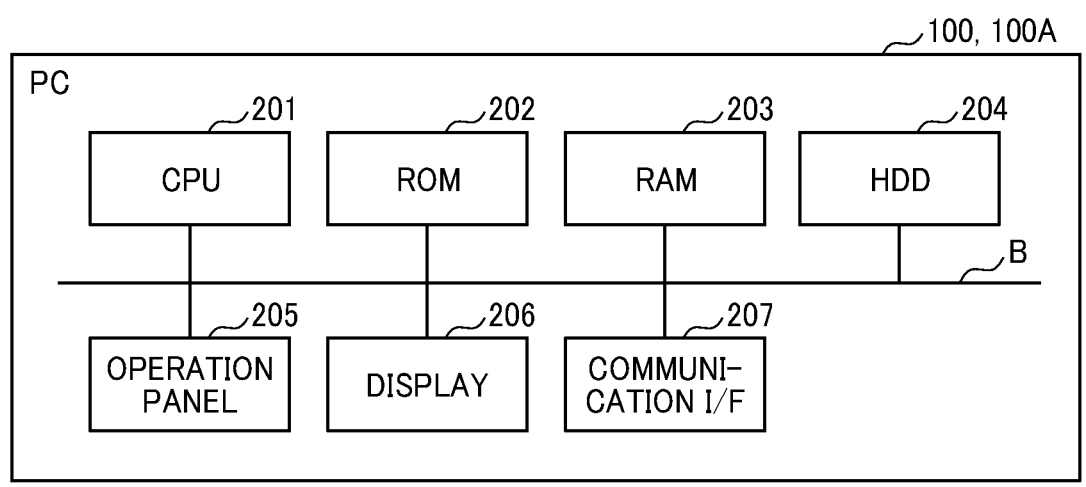
FIG. 17 is a diagram illustrating a hardware configuration of each of PCs according to the first to fifth embodiments of the present invention.

A hardware configuration of each of the PCs 100 and 100A will now be described. FIG. 17 is a diagram illustrating a hardware configuration of each of the PCs 100 and 100A according to the first to fifth embodiments. As illustrated in FIG. 17, each of the PCs 100 and 100A includes a CPU 201, a ROM 202, a RAM 203, an HDD 204, an operation panel 205, a display 206, and a communication interface (I/F) 207. These hardware components are connected to each other via a bus B.

The CPU 201 executes a variety of programs stored in the ROM 202 or the HDD 204. The ROM 202 is a nonvolatile memory. For example, the ROM 202 stores a variety of programs executed by the CPU 201 and data used by the CPU 201 to execute the variety of programs. The RAM 203 is a main memory device such as a dynamic random access memory (DRAM) or a static random access memory (SRAM). For example, the RAM 203 functions as a work area used by the CPU 201 to execute the variety of programs.

The HDD 204 is a nonvolatile memory device. For example, the HDD 204 stores a variety of programs executed by the CPU 201 and data used by the CPU 201 to execute the variety of programs. The operation panel 205 is an interface used by the user (i.e., operator) to input a variety of instructions. The display 206 is a display device that displays a variety of information. The communication I/F 207 is an interface that communicates with an external device, for example.

The setting holding unit 112 and the page storing unit 115 in each of the PCs 100 and 100A are implemented by the HDD 204, for example. The transmitting unit 121 in each of the PCs 100 and 100A is implemented by the communication I/F 207, for example. The UI unit 111 in each of the PCs 100 and 100A is implemented by the operation panel 205, for example. The other functions in each of the PCs 100 and 100A are implemented by programs stored in the ROM 202 or the HDD 204 and executed by the CPU 202, for example.

As described above, according to the PCs 100 and 100A of the foregoing embodiments, the driver 110 is capable of receiving the RGB-formatted print data transmitted from the application, and selectively generating the print data for printing with the stealth toner and the print data for printing with the CMY toners from the RGB-formatted print data.

In particular, the PCs 100 and 100A of the foregoing embodiments are capable of determining a predetermined or user-specified page of a plurality of pages included in the RGB-formatted print data as the page for which the printing with the stealth toner is to be performed, and determining a page other than the predetermined or user-specified page as the page for which the printing with the CMY toners is to be performed.

Further, the PCs 100 and 100A of the foregoing embodiments are capable of combining the print data to be printed with the stealth toner with the print data to be printed with the CMY toners such that the image formed with the stealth toner and the image formed with the CMY toners are printed on the same print medium to be superimposed upon each other.

The PCs 100 and 100A of the foregoing embodiments are therefore capable of printing a given image included in the RGB-formatted print data as a transparent image, with not need to customize the general-purpose interface used in the printer driver.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus configured to communicate with an image forming apparatus, the image forming apparatus configured to eject transparent toner using print data corresponding to a first color toner among a plurality of color toners, the first color toner being different from the transparent toner, the information processing apparatus comprising:
processing circuitry configured to,
acquire first print data in a red-green-blue format, and convert a first portion of the first print data into second print data such that the second print data corresponds to the first color toner; and
a communication interface configured to transmit the second print data to the image forming apparatus, the first color toner being replaced by the transparent toner in the image forming apparatus.

2. The information processing apparatus of claim 1, wherein the processing circuitry is configured to selectively converts a second portion of the first print data into third print data or fourth print data, the third print data corresponding to at least one second color toner among the plurality of color toners, the at least one second color toner being stored in the image forming apparatus and being different from the first color toner, the fourth print data corresponding to the first color toner.

3. The information processing apparatus of claim 2, wherein
the processing circuitry is configured to combine the second print data with the third print data to generate combined print data, the combined print data including instructions to print an image of the third print data on a print medium and print an image of the second print data over the image of the third print data; and the communication interface is configured to transmits the combined print data to the image forming apparatus.

4. The information processing apparatus of claim 3, wherein the first color toner is a black toner; and the at least one second color toner includes a cyan toner, a magenta toner, and a yellow toner.

5. The information processing apparatus of claim 3, wherein the first color toner is one of a cyan toner, a magenta toner, or a yellow toner; and the at least one second color toner is a black toner.

6. The information processing apparatus of claim 3, wherein the first portion of the first print data is the first print data of a first print page, and the second portion of the first print data is the first print data of a second print page different from the first print page.

7. The information processing apparatus of claim 6, wherein the processing circuitry is configured to:

determine the first print page based on a selection; and determine the second print page based on a non-selection.

8. The information processing apparatus of claim 7, wherein the processing circuitry is configured to combine the second print data with the third print data excluding a part of the third print data in response to a selection of the part of the third print data.

9. The information processing apparatus of claim 6, wherein the processing circuitry is configured to:

determine the first print page based on a character string included in the first print page; and determine the second print page based on the character string not being included in the second print page.

10. The information processing apparatus of claim 6, wherein the processing circuitry is configured to convert all of the first print data of the first print page into the second print data.

11. The information processing apparatus of claim 3, wherein the processing circuitry is configured to:

selectively convert the second portion of the first print data into the fourth print data when the second portion of the first print data includes a comment indicating that the first print data is to be printed with the transparent toner; and selectively convert the second portion of the first print data into the third print data when the second portion of the first print data lacks the comment indicating that the first print data is to be printed with the transparent toner.

12. The information processing apparatus of claim 3, wherein the processing circuitry is configured to:

selectively convert the second portion of the first print data into the fourth print data when the second portion of the first print data is accompanied by a notice to print the second portion of first print data with the transparent toner; and selectively convert the second portion of the first print data into the third print data when the second portion of first print data is unaccompanied by the notice to print the second portion of first print data with the transparent toner.

13. An information processing method performed by an information processing apparatus configured to communicate with an image forming apparatus, the image forming apparatus configured to eject transparent toner using print data corresponding to a first color toner among a plurality of color toners, the first color toner being different from the transparent toner, the information processing method comprising:

acquiring first print data in a red-green-blue format;

converting a first portion of the first print data into second print data such that the second print data corresponds to the first color toner; and transmitting the second print data to the image forming apparatus, the first color toner being replaced by the transparent toner in the image forming apparatus.

14. The information processing method of claim 13, further comprising:

selectively converting a second portion of the first print data into third print data or fourth print data, the third print data corresponding to at least one second color toner among the plurality of color toners, the at least one second color toner being stored in the image forming apparatus and being different from the first color toner, the fourth print data corresponding to the first color toner.

15. The information processing method of claim 14, the information processing method further comprising:

combining the second print data with the third print data to generate combined print data, the combined print data including instructions to print an image of the third print data on a print medium and print an image of the second print data over the image of the third print data, wherein the transmitting includes transmitting the combined print data to the image forming apparatus.

16. The information processing method of claim 15, wherein the first portion of the first print data is the first print data of a first print page, and the second portion of the first print data is the first print data of a second print page different from the first print page.

17. A non-transitory recording medium storing a plurality of instructions which, when executed by one or more processors, cause the one or more processors to perform an information processing method, the one or more processors being included in an information processing apparatus configured to communicate with an image forming apparatus, the image forming apparatus configured to eject transparent toner using print data corresponding to a first color toner among a plurality of color toners, the first color toner being different from the transparent toner, the information processing method comprising:

acquiring first print data in a red-green-blue format;

converting a first portion of the first print data into second print data such that the second print data corresponds to the first color toner; and transmitting the second print data to the image forming apparatus, the first color toner being replaced by the transparent toner in the image forming apparatus.

18. The non-transitory recording medium of claim 17, wherein the information processing method further comprises:

selectively converting a second portion of the first print data into third print data or fourth print data, the third print data corresponding to at least one second color toner among the plurality of color toners, the at least one second color toner being stored in the image forming apparatus and being different from the first color toner, the fourth print data corresponding to the first color toner.

19. The non-transitory recording medium of claim 18, wherein the information processing method further comprises:
  combining the second print data with the third print data to generate combined print data, the combined print data including instructions to print an image of the third print data on a print medium and print an image of the second print data over the image of the third print data,
  wherein the transmitting includes transmitting the combined print data to the image forming apparatus.

20. The non-transitory recording medium of claim 19, wherein the
  first portion of the first print data is the first print data of a first print page, and the second portion of the first print data is the first print data of a second print page different from the first print page.

* * * * *